US012726505B2

(12) United States Patent
Hutelmyer et al.

(10) Patent No.: US 12,726,505 B2
(45) **Date of Patent: *Sep. 1, 2026**

(54) VALIDATING NETWORK SECURITY ALERTING PIPELINE USING SYNTHETIC NETWORK SECURITY EVENTS

(71) Applicant: Target Brands, Inc., Minneapolis, MN (US)

(72) Inventors: Paul Hutelmyer, Minneapolis, MN (US); Caleb Walch, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 72 days.

This patent is subject to a terminal disclaimer.

(21) Appl. No.: 18/932,724

(22) Filed: Oct. 31, 2024

(65) Prior Publication Data

US 2025/0055875 A1 Feb. 13, 2025

Related U.S. Application Data

(63) Continuation of application No. 17/587,340, filed on Jan. 28, 2022, now Pat. No. 12,160,442.

(60) Provisional application No. 63/164,854, filed on Mar. 23, 2021.

(51) Int. Cl.
*H04L 9/40* (2022.01)

(52) U.S. Cl.
CPC ................................ *H04L 63/1433* (2013.01)

(58) Field of Classification Search
CPC .................................................. H04L 63/1433
See application file for complete search history.

(56) References Cited

U.S. PATENT DOCUMENTS 6,546,493 B1 4/2003 Magdych et al.
7,509,675 B2 * 3/2009 Aaron ................ H04L 63/1408 380/247
8,266,703 B1 9/2012 Magdych et al.
8,407,798 B1 * 3/2013 Lotem .................... G06F 21/55 726/21

(Continued)

OTHER PUBLICATIONS

IntruDetector: A software platform for testing network intrusion detection algorithms (Year: 2001).*

(Continued)

*Primary Examiner* — Khang Do
(74) *Attorney, Agent, or Firm* — Barnes & Thornburg LLP

(57) ABSTRACT

A system for testing an alerting pipeline of a security network can include a synthetics computing device, a network analysis computing device, and an alerting computing device. The synthetics computing device can generate a synthetic event, a non-malicious version of an actual security event, to test one or more detection signatures of the security network and inject the synthetic event into a network log of events. The network analysis computing device can scan the network log of events, identify an event that triggers a detection signature of the security network, identify the event as the injected synthetic event, and generate a notification identifying the synthetic event and an associated detection signature triggered in response to the injected synthetic event. The alerting computing device can receive the notification and flag the synthetic event. The synthetics computing device can also validate the flagged synthetic event.

14 Claims, 14 Drawing Sheets

(56) References Cited

U.S. PATENT DOCUMENTS

| | | | | |
|---|---|---|---|---|
| 8,762,948 | B1 | 6/2014 | Zaitsev | |
| 9,117,084 | B2 * | 8/2015 | Zecheru | H04L 63/1433 |
| 9,400,889 | B2 | 7/2016 | Chess et al. | |
| 9,571,517 | B2 | 2/2017 | Vallone et al. | |
| 9,773,240 | B1 * | 9/2017 | McCauley | G06Q 20/356 |
| 10,097,565 | B1 * | 10/2018 | Masse | G06F 11/3688 |
| 10,135,862 | B1 * | 11/2018 | McClintock | H04L 63/145 |
| 10,769,045 | B1 * | 9/2020 | Sharifi Mehr | G06F 21/552 |
| 11,153,152 | B2 * | 10/2021 | Siddiqi | H04L 41/0677 |
| 11,303,647 | B1 * | 4/2022 | Wu | H04L 63/0281 |
| 12,160,442 | B2 * | 12/2024 | Hutelmyer | H04L 63/1433 |
| 12,219,070 | B2 * | 2/2025 | Beauchesne | H04L 9/3247 |
| 12,489,774 | B2 * | 12/2025 | Thomas | H04L 63/1425 |
| 2014/0157415 | A1 | 6/2014 | Abercrombie et al. | |
| 2015/0229656 | A1 * | 8/2015 | Shieh | H04L 63/1491 726/22 |
| 2016/0029221 | A1 | 1/2016 | Suarez Garcia et al. | |
| 2016/0134653 | A1 * | 5/2016 | Vallone | H04L 41/046 726/25 |
| 2016/0330219 | A1 | 11/2016 | Hasan | |
| 2019/0222593 | A1 * | 7/2019 | Craig | G06N 20/20 |
| 2020/0076835 | A1 | 3/2020 | Ladnai et al. | |
| 2020/0162315 | A1 * | 5/2020 | Siddiqi | H04L 41/0677 |
| 2020/0396231 | A1 * | 12/2020 | Krebs | H04L 63/1425 |
| 2021/0042631 | A1 * | 2/2021 | Blinder | G06N 5/01 |
| 2021/0266339 | A1 * | 8/2021 | Moshitzky | H04L 63/0254 |
| 2021/0320941 | A1 * | 10/2021 | e Silva | H04L 63/1466 |
| 2021/0400071 | A1 | 12/2021 | Ray et al. | |
| 2022/0311795 | A1 * | 9/2022 | Hutelmyer | H04L 63/1433 |
| 2022/0311797 | A1 * | 9/2022 | Shavlik | H04L 63/1433 |
| 2022/0345495 | A1 * | 10/2022 | Ravi | H04L 63/0236 |
| 2024/0430276 | A1 * | 12/2024 | Whalen | G06F 8/34 |
| 2025/0055875 | A1 * | 2/2025 | Hutelmyer | H04L 63/1433 |
| 2026/0032130 | A1 * | 1/2026 | Young | H04L 63/1416 |

OTHER PUBLICATIONS

Semi-Synthetic Data Set Generation for Security Software Evaluation (Year: 2014).*

Skopik et al., Semi-Synthetic Data Set Generation for Security Software Evaluation, 2014, 2014 Twelfth Annual Conference on Privacy, Security and Trust (PST) (Year: 2014), pp. 156-163.

* cited by examiner

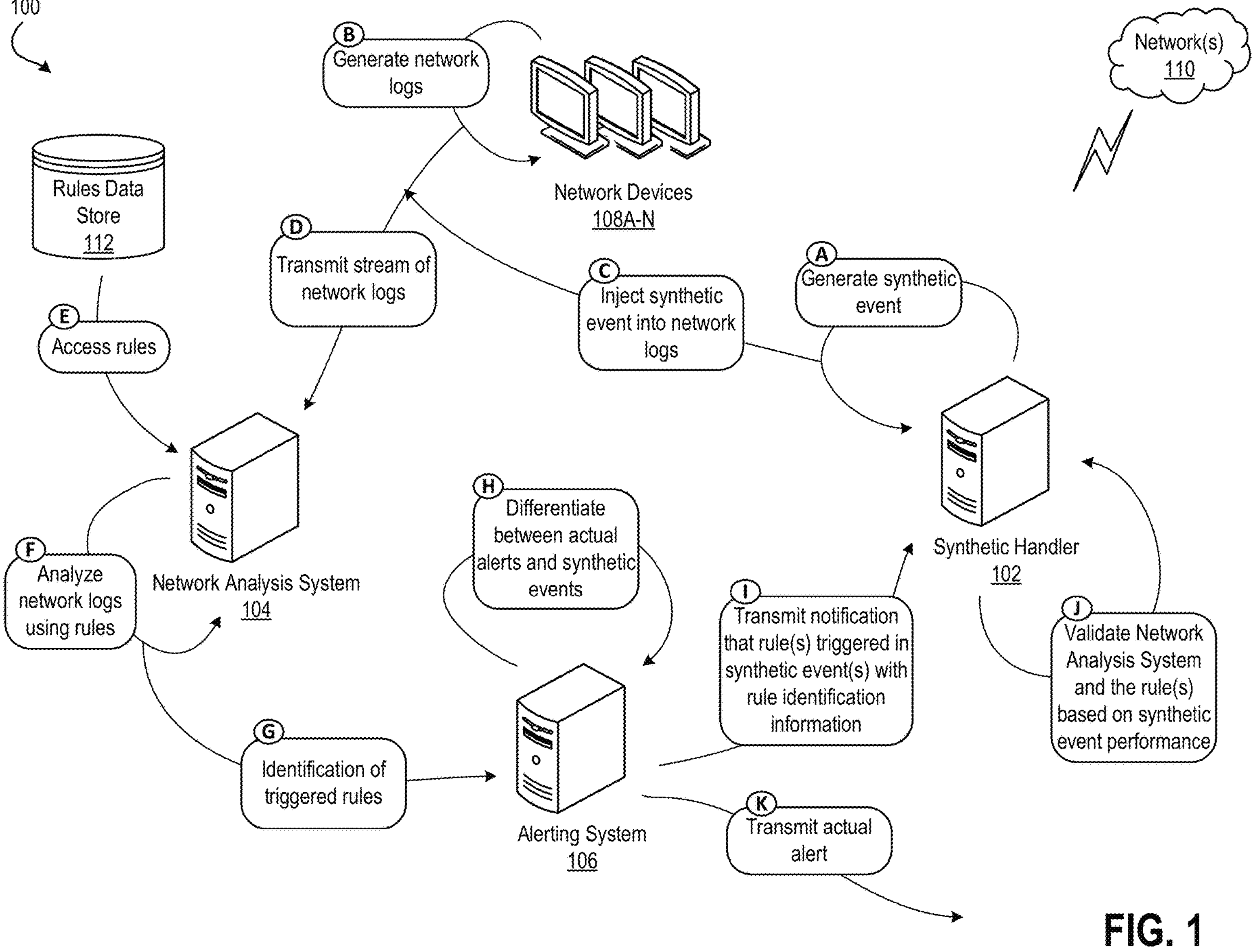
100
Network(s) 110
Rules Data Store 112
Network Devices 108A-N
Network Analysis System 104
Synthetic Handler 102
Alerting System 106
A Generate synthetic event
B Generate network logs
C Inject synthetic event into network logs
D Transmit stream of network logs
E Access rules
F Analyze network logs using rules
G Identification of triggered rules
H Differentiate between actual alerts and synthetic events
I Transmit notification that rule(s) triggered in synthetic event(s) with rule identification information
J Validate Network Analysis System and the rule(s) based on synthetic event performance
K Transmit actual alert
FIG. 1

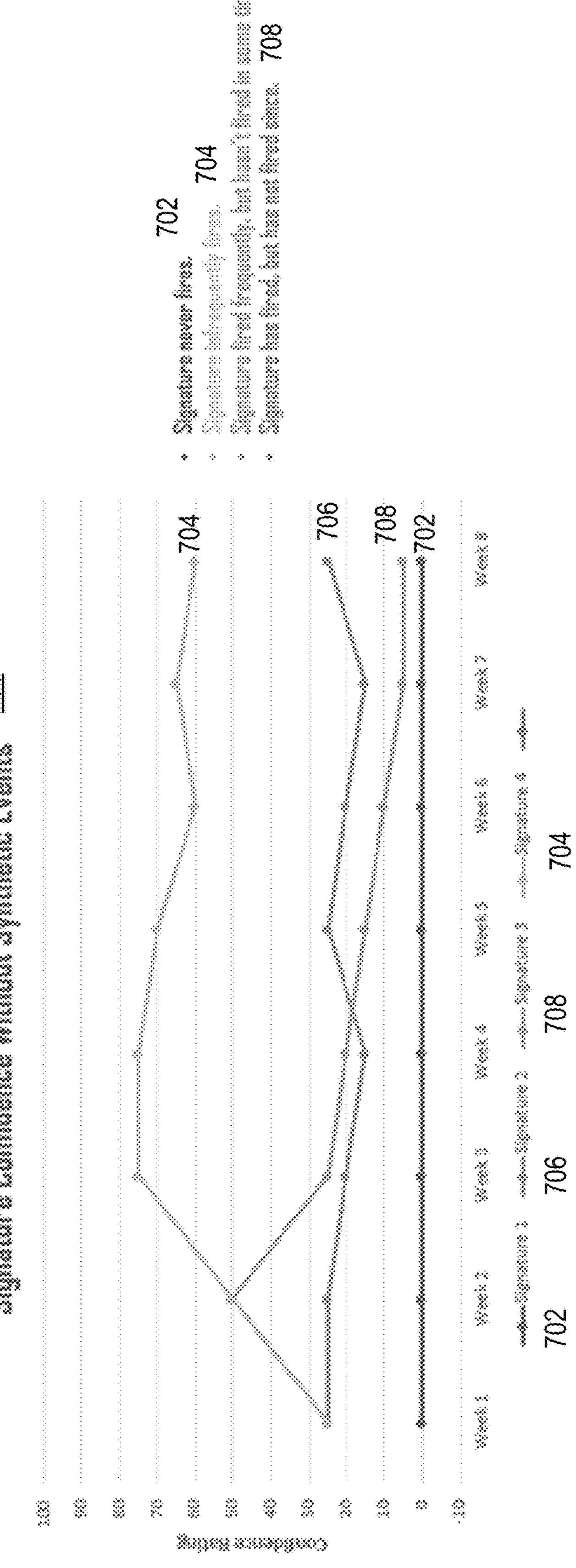
Signature Confidence Without Synthetic Events
700
Confidence Rating
Week 1
Week 2
Week 3
Week 4
Week 5
Week 6
Week 7
Week 8
Signature 1
Signature 2
Signature 3
Signature 4
702
704
706
708
Signature never fires.
Signature infrequently fires.
Signature fired frequently, but hasn't fired in some time.
Signature has fired, but has not fired since.
FIG. 7

VALIDATING NETWORK SECURITY ALERTING PIPELINE USING SYNTHETIC NETWORK SECURITY EVENTS

CROSS-REFERENCE TO RELATED APPLICATIONS

This application is a continuation of U.S. patent application Ser. No. 17/587,340, filed Jan. 28, 2022, which claims the benefit of U.S. Patent Application Ser. No. 63/164,854, filed Mar. 23, 2021. The disclosures of the prior applications are considered part of (and are incorporated by reference in) the disclosure of this application.

TECHNICAL FIELD

This document describes devices, systems, and methods related to testing an alerting pipeline through the use of synthetic network security events.

BACKGROUND

Entities, such as corporations, can implement security systems to protect against network security threats, internet security threats, hackers, and other malicious parties that intend to compromise the entity's network infrastructure. A security system deployed by the entity can detect malicious events before the bad actors can fully infiltrate the entity's system, thereby protecting the entity from the malicious intent of the hacker.

Detection signatures or rules can be developed and deployed in the security systems to act as gatekeepers. For example, some detection signatures can be configured to analyze network data and traffic. These signatures can continuously monitor the network data and traffic to look for potential threats. These signatures can also monitor or scan the network data and traffic at different time intervals or at predetermined times. When potential threats are identified, one or more detection signatures can be triggered to respond. Some detection signatures can respond by sending alerts to the entity or other parties or relevant stakeholders. The alerts can notify such parties of a potential or actual network security threat. The alerts can also include an indication of how serious the network security threat may be. The alerts can also provide instructions or recommendations on how the parties should respond to the identified threat.

Security threats can and do change over time, and some existing detection signatures may not pick up on or identify these security threats. Security Instrumentation Platforms (SIPs) can be used to simulate attack techniques in order to test a SIEM's detection capabilities. However, significant amounts of effort may be needed to build out all possible attack scenarios in such platforms. Detection signatures can and should be updated to respond to these new security threats, however, through the lifetime of the detection signatures, they may not be continuously checked to ensure that they are functioning properly.

SUMMARY

This document generally relates to technology for validating network security systems and the rules that they use to ensure the system responds to ever-changing network security events or threats. In particular, ongoing integrity checks can be performed on an alerting pipeline of the security system to identify whether appropriate detection rules (e.g., detection signatures) are triggered when a security event is identified. The ongoing integrity checks can include injecting (e.g., by a user or by a system) a synthetic event into the alerting pipeline. In other words, an event can be generated (e.g., by a developer or security expert) that mimics an actual security event that would trigger a system alert. The event can be tagged in such a way that causes the security system to recognize that the event is synthetic and not the actual security event. The synthetic event can then be passed through the alerting pipeline to test whether the right detection rules are triggered in response without actually causing the system to respond to the synthetic event as if it were a real security event.

The synthetic event can be designed to look like a normal event and can generate an alert acknowledgement if it matches a detection rule. After the alert acknowledgement occurs, or a predefined time is reached without acknowledgement, the synthetic event can be validated. Validation includes determining whether the synthetic event passed or failed, or whether the appropriate detection rule was triggered in response to the synthetic event.

As the synthetic event moves through the alerting pipeline, testing results can be generated along with metadata, which can be used to identify particular detection rules that may not have fired properly. Synthetic event test results can be reported out to a developer or other security expert, who can review the test results and address or modify the detection rules that may not have fired properly (e.g., synthetic events that failed to alert as expected). Synthetic events can be continuously injected (e.g., automatically, at predetermined time intervals, etc.) into the alerting pipeline such that the detection rules can be tested, reviewed, and modified if needed. Implementing a continuous synthetic event solution for testing and validating detection rules and their components can increase confidence in the detection security system.

Particular embodiments described herein include a system and a method for testing an alerting pipeline of a security network, the system having a synthetics computing device, a network analysis computing device in communication with the synthetics computing device, an alerting computing device in communication with the network analysis computing device, and a data store. The synthetics computing device can be configured to generate a synthetic event, wherein the synthetic event is a non-malicious version of an actual security event, wherein, when executed, the synthetic event tests one or more detection signatures of the security network, and inject the synthetic event into a network log of events. The network analysis computing device can be configured to scan the network log of events, identify an event in the network log of events that triggers a detection signature of the security network, identify the event as the injected synthetic event, generate, based on identifying the event as the injected synthetic event, a notification identifying the synthetic event and an associated detection signature that was triggered in response to the injected synthetic event, and generate, in response to identifying that the event is not the injected synthetic event, an actual alert for the event. The alerting computing device can be configured to receive, from the network analysis computing device, the notification for the synthetic event, and flag the synthetic event based on the notification identifying that (i) the synthetic event caused the associated detection signature to trigger an alert or (ii) the injected security event did not cause the associated detection signature to trigger an alert within a predetermined amount of time. The data store can store at least one of generated synthetic events, detection signatures of the security network, and reports for injected security events. The synthetics computing device can also be configured to receive the flagged synthetic event from the alerting computing device and validate the flagged synthetic event. Validating the flagged synthetic event can include identifying the flagged synthetic event as a success based on determining that (i) the associated detection signature was supposed to be triggered by the synthetic event or (ii) the synthetic event was not supposed to trigger any detection signature, and identifying the flagged synthetic event as a failure based on determining that (i) the associated detection signature was not supposed to be triggered by the synthetic event or (ii) the synthetic event was supposed to trigger a detection signature.

In some implementations, the system can optionally include one or more of the following features. For example, the data store can be configured to store synthetic event templates for each of the detection signatures of the security network. The synthetics computing device can further be configured to generate the synthetic event by identifying a first of the detection signatures of the security network to test, receiving, from the data store, a synthetic event template that resembles an actual security threat that triggers the first of the detection signatures, generating the synthetic event using the synthetic event template, and injecting a synthetic tag into the synthetic event. The synthetic tag can indicate that the synthetic event is not the actual security threat. The network analysis computing device can also be configured to identify that the event is the injected synthetic event based on identifying the synthetic tag in the synthetic event. The synthetics computing device can also generate the synthetic event by injecting a timestamp into the synthetic event. The timestamp can be included in the synthetic event template and based on formatting requirements of at least one of the actual security threat and the first of the detection signatures.

As another example, the synthetics computing device can also be configured to inject the synthetic event into the network log of events at predetermined time intervals. The synthetics computing device can also receive, from a user computing device, instructions to inject the synthetic event into the network log of events at a time that is different than the predetermined time intervals, and inject the synthetic event into the network log of events at the time designated by the instructions.

Moreover, the network analysis computing device can identify an event in the network log of events that triggers a detection signature of the security network by accessing, from the data store, the detection signatures of the security network, matching the event with one of the detection signatures that is triggered by execution of the event, and tagging the event with an identifier that is associated with the one of the detection signatures.

In some implementations, the synthetics computing device, network analysis computing device, and alerting computing device can be the same device. In some implementations, the synthetics computing device can identify the flagged synthetic event as a failure based on determining that the synthetic event was supposed to trigger another detection signature that is different than the associated detection signature. In some implementations, the synthetics computing device can generate a report identifying the injected synthetic event as a success or a failure. The report can include the associated detection signature and a timestamp corresponding to a time at which the synthetic event triggered the associated detection signature.

As another example, the system can also include a user computing device that can receive the report identifying the injected synthetic event as a failure, output, at a graphical user interface (GUI) display of the user computing device, the report, receive, at the GUI display, user input indicating one or more modifications to the associated detection signature, and transmit, to the data store, the modified detection signature. As yet another example, the synthetics computing device can generate a second synthetic event, a non-malicious version of a second actual security event, that, when executed, the second synthetic event tests the modified detection signature, and inject the second synthetic event into the network log of events.

The devices, system, and techniques described herein may provide one or more of the following advantages. Continuously and automatically testing system rules using synthetic events can be beneficial to ensure that the rules are working as designed. Such ongoing integrity checks can provide for testing and validating threat detection signatures and their components as new events are ingested into the system and as data changes over time. Synthetic events can be automatically injected into the system alerting pipeline at predetermined times to provide for continuous validation of the system rules. Synthetic events can also be injected by a user at user-defined times such that that the user can test the system rules when desired. As a result, the system rules can be continuously checked and updated.

As another example, the disclosed technology can provide for increasing overall confidence of a detection system. Since the system rules are continuously checked and/or validated, users can become more confident that the system rules fire properly in response to actual threats. Moreover, if the rules do not fire properly, they can be brought to the attention of the users, who can respond immediately by modifying the rules accordingly. So long as the system rules are continuously being checked, confidence in rule triggering and performance can be maintained and/or improved.

As another example, the disclosed technology can provide an interface for viewing aggregated information about rule performance. A user can see information about execution of a synthetic event, what rule was triggered/tested, and/or whether the rule was properly triggered. The interface can map out potential places along the system alerting pipeline that can cause rules to fail to trigger or otherwise not fire properly. This information can provide a more holistic view of system rules, which can assist the user in modifying or updating the rules and otherwise auditing the entire security system.

Moreover, the disclosed technology can run in the background without affecting or changing overall performance of the system. When synthetic events are injected to test the system rules, the synthetic events can alert the rules engine without making the alert visible to the security system users. Therefore, the system may not treat the synthetic event like an actual event but the rules themselves can still be tested to determine whether they fire properly.

The details of one or more implementations are set forth in the accompanying drawings and the description below. Other features and advantages will be apparent from the description and drawings, and from the claims.

BRIEF DESCRIPTION OF THE DRAWINGS

FIG. 1 is a conceptual diagram of an example system for implementing synthetic event testing techniques described herein.

FIG. 7 is a graph depicting rule confidence when synthetic events are not used in system testing.

Like reference symbols in the various drawings indicate like elements.

DETAILED DESCRIPTION OF ILLUSTRATIVE EMBODIMENTS

Figure 2:
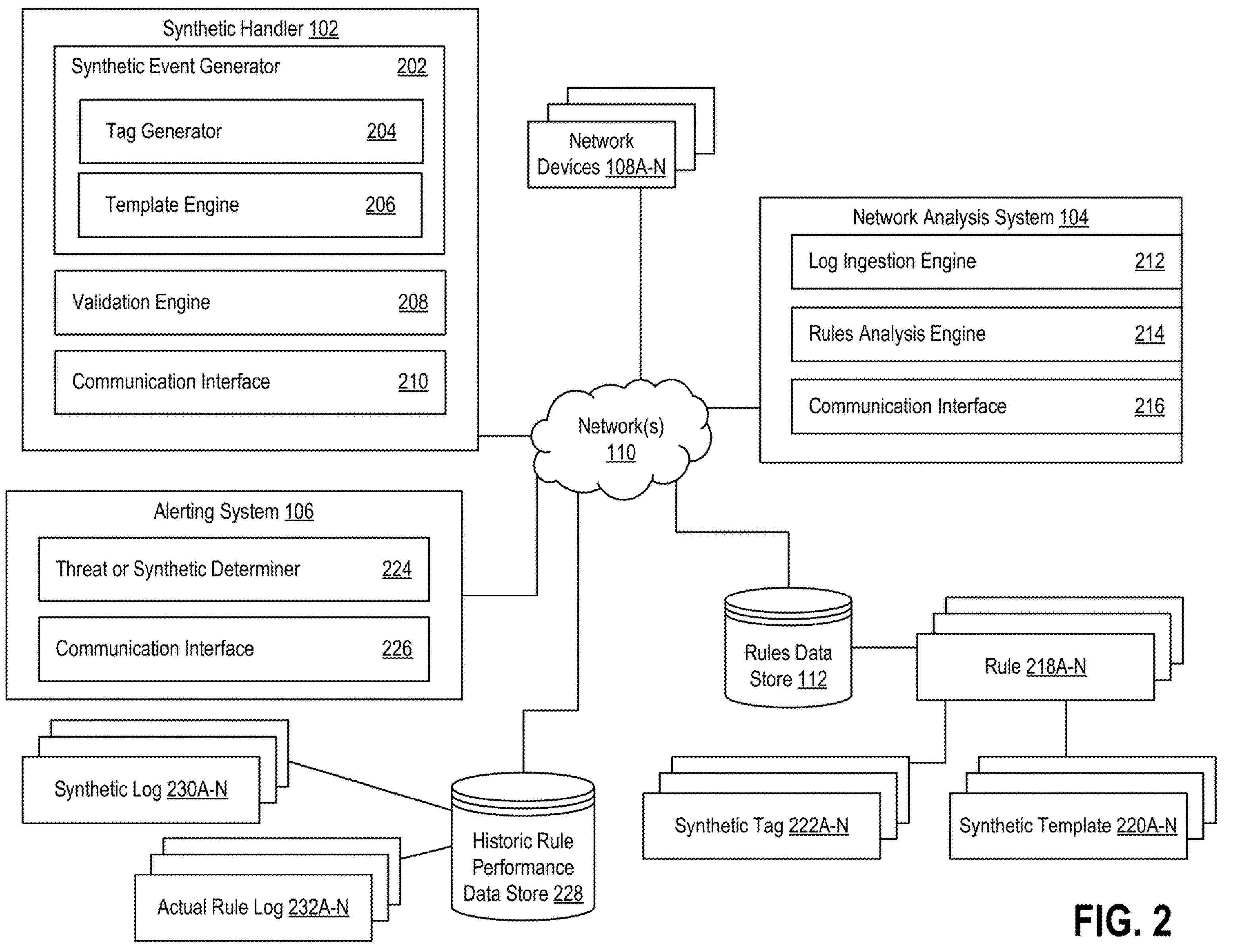
FIG. 2 is a system diagram of components used for implementing the synthetic event testing techniques.

This document generally relates to testing an alerting pipeline by performing ongoing integrity checks with synthetic events. The disclosed technology can provide for continuous monitoring of system rules or detection signatures to ensure such rules are being triggered properly and the system as a whole is also functioning as intended. This can result in increased confidence in the security system. For example, every twelve hours (or other user-defined time intervals), synthetic events can be injected to test an alerting pipeline and to ensure that the entire system is functioning properly. Such continuous checking can be advantageous to a developer or other user who, based on such reporting, can immediately address rules or other components of the system that are not functioning properly.

When a user or entity implements a security information and event management system (SIEM), they may assume that the SIEM is functioning properly (e.g., generating error messages, reporting on actual security threats, etc.). A rules engine can be configured to scan all data that comes into the SIEM. However, in some cases, the rules engine may not be properly triggered and alerts can be improperly silenced. Some testing techniques can employ a script to compare what alerted against what should have alerted. In such techniques, the SIEM logic can be run separately. Using the disclosed technology, SIEM logic can be checked in an alerting pipeline at set intervals, thereby providing for continuous and ongoing security system checks.

As described herein, synthetic events can be user-inputted. They can be injected into an alerting pipeline of the system by a user at user-defined times and/or automatically by the system itself in various intervals. The synthetic events can be configured to go through the system, be scanned by the rules engine of the system, and generate a test alert in the system. The synthetic event can be tagged such that it triggers the rules engine without causing the users to respond to the synthetic event as if it is a real threat event. Therefore, the synthetic events can be run in the background as the system continues normal operation. This can provide for validating components of the entire system (e.g., such as alerting pipelines, rule engines, and individual rules logic) without compromising on the system's ability to address real threats or events in real-time. In some implementations, the disclosed technology can provide for checking external components that are connected to or in communication with the security system or components of the system. Based on synthetic event testing results, external components can also be adjusted by the user or other developers, thereby increasing their confidence as well.

Referring to the figures, FIG. 1 is a conceptual diagram of an example system 100 for implementing synthetic event testing techniques described herein. A synthetics handler 102, a network analysis system 104, an alerting system 106, and network devices 108A-N can be in communication (e.g., wired and/or wireless) via network(s) 110. In some implementations, one or more of the synthetics handler 102, the network analysis system 104, and the alerting system 106 can be the same computing system. The network devices 108A-N can include user devices, such as computers, laptops, mobile phones, and/or tablets. One or more users can use the network devices 108A-N and perform operations that can cause triggering of security rules (e.g., detection signatures) at the network analysis system 104.

Referring to FIG. 1, the synthetics handler 102 can generate a synthetic event (A). As described herein, the synthetic event can replicate an actual event that can cause triggering of a rules engine in the network analysis system 104. Unlike the actual event, the synthetic event can include a tag that the alerting system 106 can use in differentiating the synthetic event from actual events. If the synthetic event does not include the tag, then the synthetic event can cause the alerting system 106 to respond as if the synthetic event is an actual threat event. In some implementations, the synthetic event can be generated by a user, such as a developer at one of the network devices 108A-N.

The network devices 108A-N can generate network logs (B). The network logs can be generated at a same time as the synthetic event is generated (A). In some implementations, the network logs can be generated at a different time than the synthetic event generation. Although the network logs are depicted as being generated after the synthetic events in FIG. 1, the network logs can also be generated before the synthetic events.

The synthetic event can be injected into the network logs by the synthetics handler 102(C). As described herein, the synthetic event can be automatically injected at predetermined time intervals (e.g., every 12 hours). The synthetic event can also be additionally or alternatively injected at user-defined time intervals. For example, a user can generate a synthetic event to run only once. The user can inject that synthetic event into the network logs at a time of the user's preference. When the synthetic events are injected into the stream, the synthetic events can be handled or treated like other events in the stream. In other words, the synthetic events may not override or take priority over other operations, events, or activities in the stream. Therefore, the synthetic events can be injected into the stream without impacting network activity at the devices 108A-N.

In some implementations, more than one synthetic event can be generated at a time (A) and injected into the network logs (C). More than one synthetic event can also be run at a time to test different components of the alerting pipeline (e.g., different synthetic events can test different rules in a rules engine).

The stream of network logs can be transmitted from the network devices 108A-N to the network analysis system 104(D). As shown in FIG. 1, the stream of network logs can be transmitted once the synthetic event is injected therein. In other implementations, the synthetic events can be injected into the stream of network logs as the stream is transmitted to the network analysis system 104.

Once the network analysis system 104 receives the network logs, the system 104 can access rules (e.g., detection signatures) from a rules data store 112. The rules data store 112 can be a database, cloud storage, or other structure for storing data. The rules data store 112 can store rules that are used for detecting and responding to malicious activity or other activity across a network. Which rules are used for detection can be determined based on settings that are configured by the users, such as detection authors. The users can set rules as active or inactive, and as test or "live." The system 104 can access rules specific to the stream of network logs. The system 104 can also access rules that can be applied to one or more security information management (SIEM) operations performed by the network analysis system 104.

Using the rules, the network analysis system 104 can analyze the network logs (F). Analyzing the network logs can include comparing a currently selected log event to a complete set of active rules and looking for logical matches between the two. Analyzing the network logs can include determining whether any of the rules are triggered by activity in the logs. Triggered rules can be identified by the network analysis system 104. Notification of such triggers can be transmitted to the alerting system 106(F).

The alerting system 106 can differentiate between actual alerts and synthetic alerts (H). For example, upon receiving the identification of triggered rules, the system 106 can look at the events in the network logs that triggered rules to see whether the events have synthetic tags. If the events have synthetic tags, then such events are synthetic events that were generated and injected by the synthetics handler 102 for testing the system alerting pipeline. If the events do not have synthetic tags, then the alerting system 106 can determine that the event is an actual event/alert, such as a real security threat.

If the alerting system 106 identifies a synthetic event (H), the system 106 can transmit to the synthetics handler 102 a notification that rule(s) were triggered in the synthetic event(s) (I). The transmitted notification can include rule identification information. The synthetics handler 102 can use the transmitted information to validate the network analysis system 104 and/or the triggered rule(s) based on the synthetic event(s) performance (J). For example, the handler 102 can determine whether the synthetic event(s) was supposed to trigger a rule, whether the synthetic event(s) triggered the correct rule, and/or whether the triggered rule functioned/performed properly in response to being triggered by the synthetic event. In some implementations, the handler 102 can also generate a report about rule and overall system performance, which can be presented to one or more users at the network devices 108A-N and/or other devices. For example, the report can be provided to a user who generated the synthetic event that triggered a rule. The user can then review and/or modify the triggered rule based on the information provided in the report.

In some implementations, as depicted, the alerting system 106 can also transmit an actual alert (K) when the system 106 determines that an actual alert had triggered a rule (H). The network analysis system 104 and/or another SIEM computing system can then address the actual alert accordingly.

A-K can be repeated and/or part of a continuous feedback loop. A-K can be performed at predefined time intervals (e.g., every 12 hours), as described herein. For example, the same generated synthetic events can be injected into the network logs every 12 hours. As another example, different synthetic events can be generated and injected into the network logs every 12 hours. A combination of both previously used and new synthetic events can be injected into the network logs every 12 hours. Continuous injection of synthetic events into the network logs can be advantageous as an ongoing check of how the SIEM responds to real-time, dynamic changes in network activity. In some implementations, A-K can also be performed at different time intervals, for example, based on user preference in testing the network analysis system 104, alerting system 106, and overall alerting pipeline of the SIEM.

FIG. 2 is a system diagram of components used for implementing the synthetic event testing techniques. As described herein, the synthetics handler 102, network analysis system 104, alerting system 106, and network devices 108A-N can communicate via the network(s) 110. One or more of the components 102, 104, and 106 can also be in communication with the rules data store 112 and/or a historic rule performance data store 228.

The rules data store 112 can store rules 218A-N, synthetic tags 222A-N, and synthetic templates 220A-N. In some implementations, the synthetic tags 222A-N and the synthetic templates 220A-N can be associated with each other and/or the rules 218A-N. In other implementations, the synthetic tags 222A-N and/or the synthetic templates 220A-N may not be associated with the rules 218A-N in the data store 112. Synthetic tags 222A-N can be inserted into a synthetic event before that event is injected into a stream of network logs. As described herein, the tags 222A-N can be used by the alerting system 106 to different synthetic events from actual events. The synthetic templates 220A-N can be used by the synthetics handler 102 for generating synthetic events.

The historic rule performance data store 228 can store synthetic logs 230A-N and actual rule logs 232A-N. The synthetic logs 230A-N can include reports of synthetic events that are injected into network logs. The synthetic logs 230A-N can include information about rules that were triggered in response to the synthetic events and performance of such triggered rules and/or the overall system (e.g., the network analysis system 104 and/or the alerting system 106). The actual rule logs 232A-N can include information about how the overall system (e.g., the network analysis system 104 and/or the alerting system 106) responded to the actual alerts.

The synthetics handler 102 includes a synthetic event generator 202, a validation engine 208, and a communication interface 210. The synthetic event generator 202 can include a tag generator 204 and a template engine 206. The tag generator 204 can access, from the rules data store 112, a synthetic tag 222A-N that is associated with a rule 218A-N to be tested. The synthetic tag 222A-N can be inserted into the log events for the generated synthetic event such that the synthetic event may not be treated as an actual alert by the network analysis system 104 and/or the alerting system 106. The template engine 206 can also be configured to access, from the rules data store 112, a synthetic template 220A-N that is associated with both the synthetic tag 222A-N and the corresponding rule 218A-N. Using the synthetic template 220A-N and the synthetic tag 222A-N, the synthetic event generator 202 can create a synthetic event that can be injected into a stream of network logs, as described herein.

The validation engine 208 can be configured to analyze performance of the triggered rule(s), the network analysis system 104, and/or the alerting system 106 based on the injected synthetic event. The validation engine 208 can receive alerts from the alerting system 106. The alerts can include information associated the triggered rule with a synthetic event. The validation engine 208 can also access information such as synthetic logs 320A-N and actual rule logs 232A-N from the historic rule performance data store 228. Using this information, the validation engine 208 can determine whether the triggered rules are firing properly and/or whether the overall system is operating properly. For example, the validation engine 208 can compare synthetic logs 230A-N to actual rule logs 232A-N, where the triggered rule in the actual rule logs 232A-N is the same as the triggered rule in the synthetic logs 230A-N. Such a comparison can be advantageous to determine whether the rule is uniformly triggering with every event, whether it be a synthetic event or an actual event. If the rule is not uniformly triggering, this can be an indication that the rule needs to be updated or modified.

Using information received from the alerting system 106 (in addition to or instead of information accessed from the historic rule performance data store 228), the validation engine 208 can also determine whether the synthetic event was supposed to trigger a rule, whether the proper rule was triggered, and/or whether the rule triggered as intended. Optionally, the validation engine 208 can aggregate information about performance of triggered rules, the network analysis system 104, and/or the alerting system 106. By aggregating such information, the synthetics handler 102 can provide to a user, such as a security information specialist or system developer, reports that the user can use to modify, update, or otherwise change one or more components of the SIEM, as described herein.

The network analysis system 104 can include a log ingestion engine 212, a rules analysis engine 214, and a communication interface 216. The log ingestion engine 212 can be configured to executed network logs. As described herein, the network logs can be received from the network devices 108A-N. The network logs can include injected synthetic events. Once the network logs are executed, the rules analysis engine 214 can access rules 218A-N from the rules data store 112. The engine 214 can review the executed network logs and identify which, if any, events within the logs triggered rules 218A-N. In determining whether rules are being triggered, the rules analysis engine 214 may not differentiate between actual events and synthetic events. In other words, whether or not a rule is triggered by an actual event or a synthetic event, the engine 214 will identify that triggered rule. Identified rules 218A-N can be transmitted to the alerting system 106 for further analysis.

The alerting system 106 includes a threat or synthetic determiner 224 and a communication interface 226. The threat or synthetic determiner 224 can be configured to differentiate synthetic events from actual events in the network logs. This can be accomplished by accessing the rules 218A-N and determining whether the corresponding synthetic tags 222A-N appear for the events in the network logs. If an event has a synthetic tag that corresponds to a triggered rule, then the determiner 224 can identify that event as a synthetic event. If, on the other hand, the event does not have a synthetic tag corresponding to a triggered rule, then the determiner 224 can identify that event as an actual event. In some implementations, the determiner 224 can also access synthetic logs 230A-N and/or actual rule logs 232A-N from the data store 228 to determine whether the events in the network logs are supposed to be synthetic events or actual events. Once the determiner 224 differentiates actual events from synthetic events, a notification can be sent to the synthetics handler 102 that identifies the synthetic events, the triggered rules, and runtime information that can be used, by the validation engine 208, to validate performance of the overall system (e.g., components of the network analysis system 104 and/or the alerting system 106).

Finally, the communication interfaces 210, 216, and 226 can be configured to provide communication between one or more components described herein.

Figure 3A:
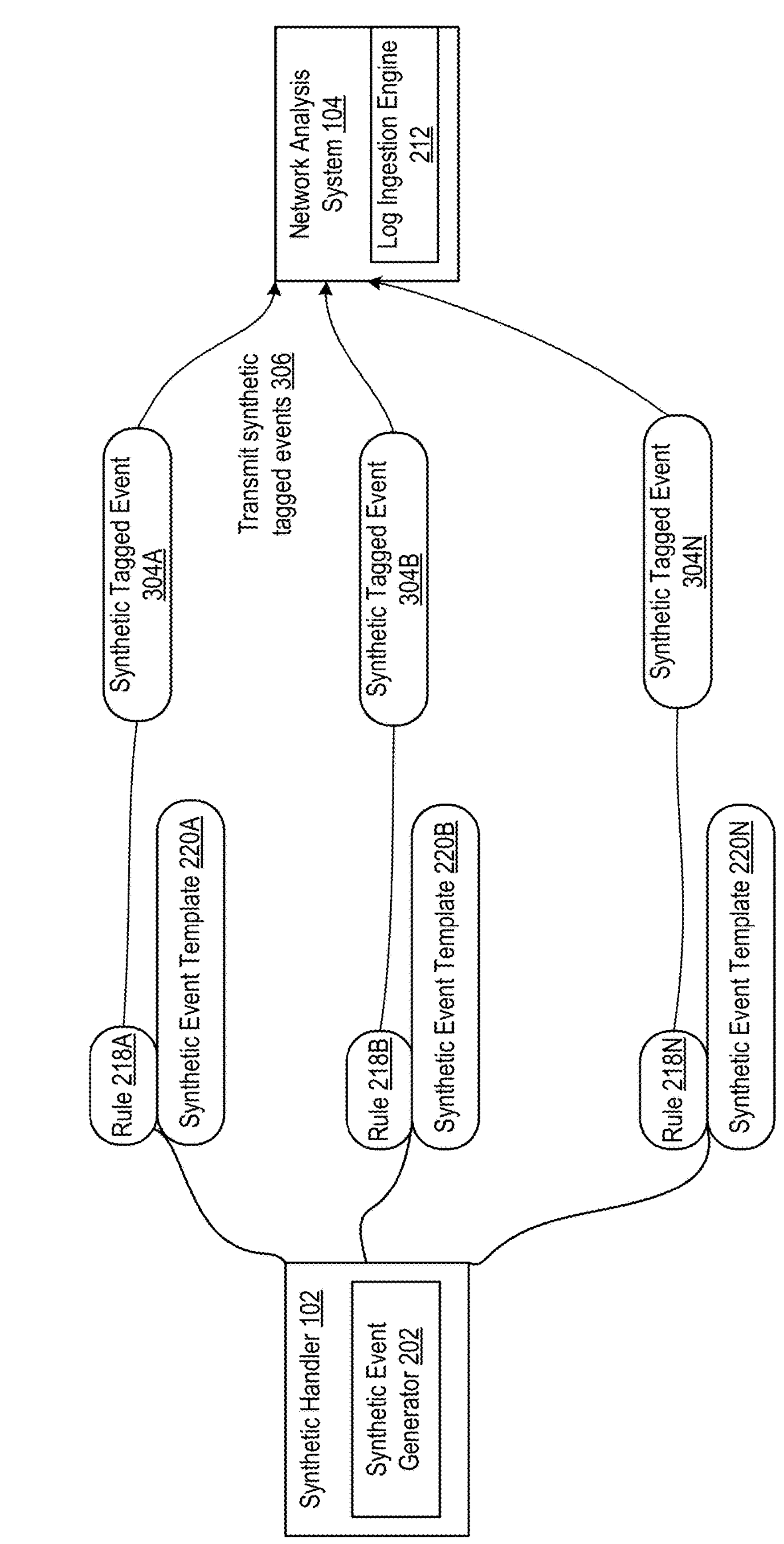
FIG. 3A depicts generating a synthetic event.

FIG. 3A depicts generating a synthetic event 300. The synthetic event generator 202 of the synthetics handler 102 can generate synthetic tagged events 304A-N. To create the events 304A-N, the generator 202 can access the rules 218A-N and their associated synthetic event templates 220A-N from the rules data store 112. Each event that can be injected into network logs can be formatted differently, especially based on log type. Therefore, the templates 220A-N can be generated to accommodate for the formatting requirements of different events and logs. The templates 220A-N can add network information specific to each of the synthetic tagged events 304A-N, including but not limited to timestamps, machine identifiers, and/or rule or event source identifiers. Importantly, a current timestamp needs to be injected into code of each of the synthetic tagged events 304A-N before the synthetic tagged events 304A-N can be injected into the network logs. Formatting such as the timestamps can be automatically or dynamically updated in the synthetic tagged events 304A-N by the synthetic event generator 202.

In some implementations, a user at the synthetics handler 102 or another computing system or device can generate the synthetic tagged events 304A-N using the synthetic event templates 220A-N. As a result, the user can modify and properly format the code for the synthetic tagged events 304A-N. Using the templates 220A-N can be advantageous to ensure not only proper formatting of the events 304A-N for execution but also quicker generation of the events 304A-N. A user can more easily generate events 304A-N and inject them into streams of network logs for immediate testing of system components. The user does not have to spend significant blocks of time creating the events 304A-N from scratch.

As shown in FIG. 3A, the synthetic event generator 202 can match the rule 218A with the synthetic event template 220A to generate the synthetic tagged event 304A. Likewise, the rule 218B can be matched with the template 220B to generate synthetic tagged event 304B and the rule 218N can be matched with the template 220N to generate synthetic tagged event 304N.

The synthetic tagged events 304A-N can then be transmitted 306 to the network analysis system 104. The log ingestion engine 212 at the system 104 can then execute the stream of network logs, which includes the synthetic tagged events 304A-N injected therein. As described throughout, the events 304A-N can be transmitted 306 on a frequency that is defined by the user submitting the events 304A-N to the system 104. For example, the user can set time intervals to inject the events 304A-N into the stream of network logs. In other implementations, the synthetics handler 102 can automatically transmit 306 the events 304A-N to the system 104 at set time intervals or frequencies. The time intervals or frequencies can be determined or set by the user (e.g., every 12 hours), as described herein.

Figure 3B:
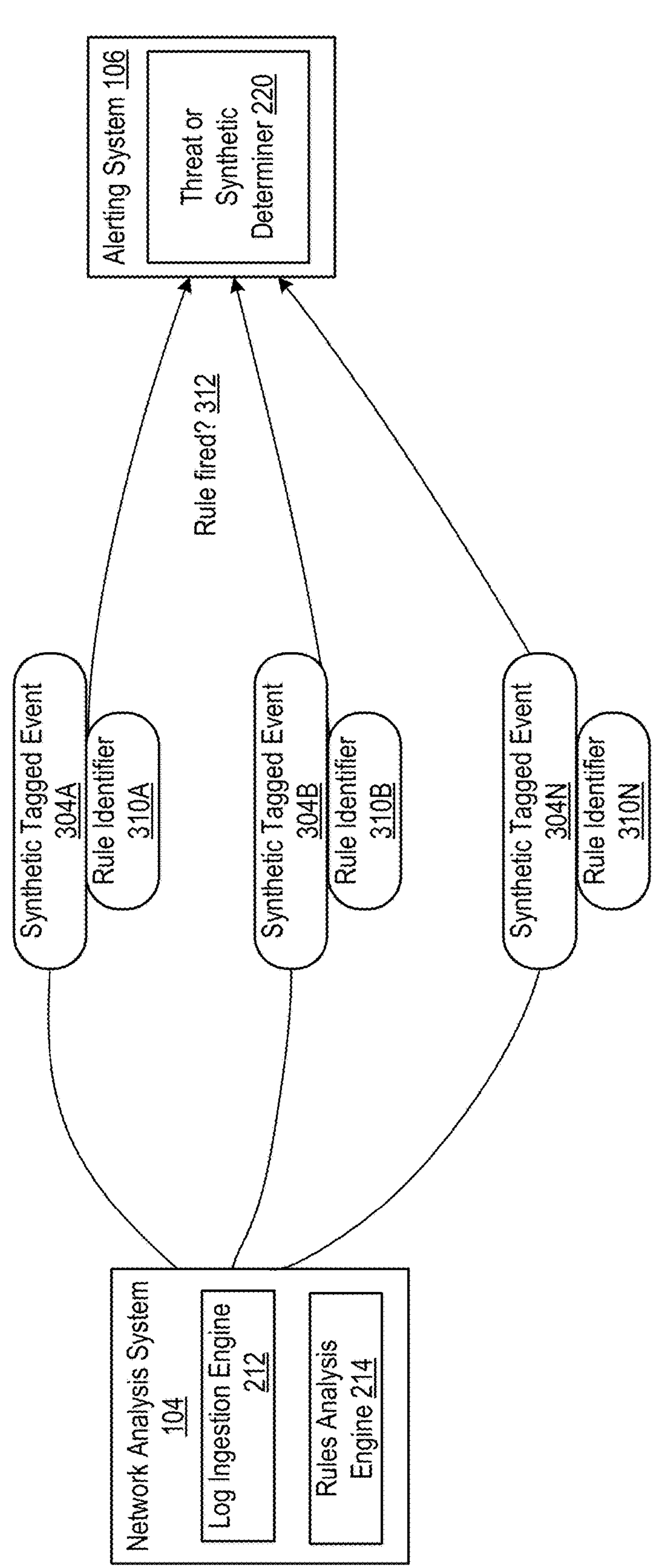
FIG. 3B depicts using the generated synthetic event to acknowledge an alert.

FIG. 3B depicts using the generated synthetic event to acknowledge an alert 308. The log ingestion engine 212 of the network analysis system 104 can execute the synthetic tagged events 304A-N. Rules can be accessed from the rules data store 112 and used by the rules analysis engine 214 to identify which rules are triggered by which events 304A-N. When rules are identified, the events 304A-N can be tagged with corresponding rule identifiers 310A-N. A rule fired notification can be transmitted 312 to the threat or synthetic determiner 220 of the alerting system 106. Based on the event 304A-N and rule identifier 310A-N, the determiner 220 can identify whether the event 304A-N is in fact a synthetic event or an actual event, as described herein. As shown by FIG. 3B, synthetic tagged events 304A-N can act like normal/actual events and can cause an alert if the event 304A-N is matched with a rule. However, as described throughout this disclosure, the synthetic tags included in the synthetic tagged events 304A-N can be used by the alerting system 106 to differentiate the events 304A-N from actual alerts. As a result, the alerting system 106 may respond accordingly to actual alerts and report on the synthetic tagged events 304A-N to the synthetics handler 102.

Figure 3C:
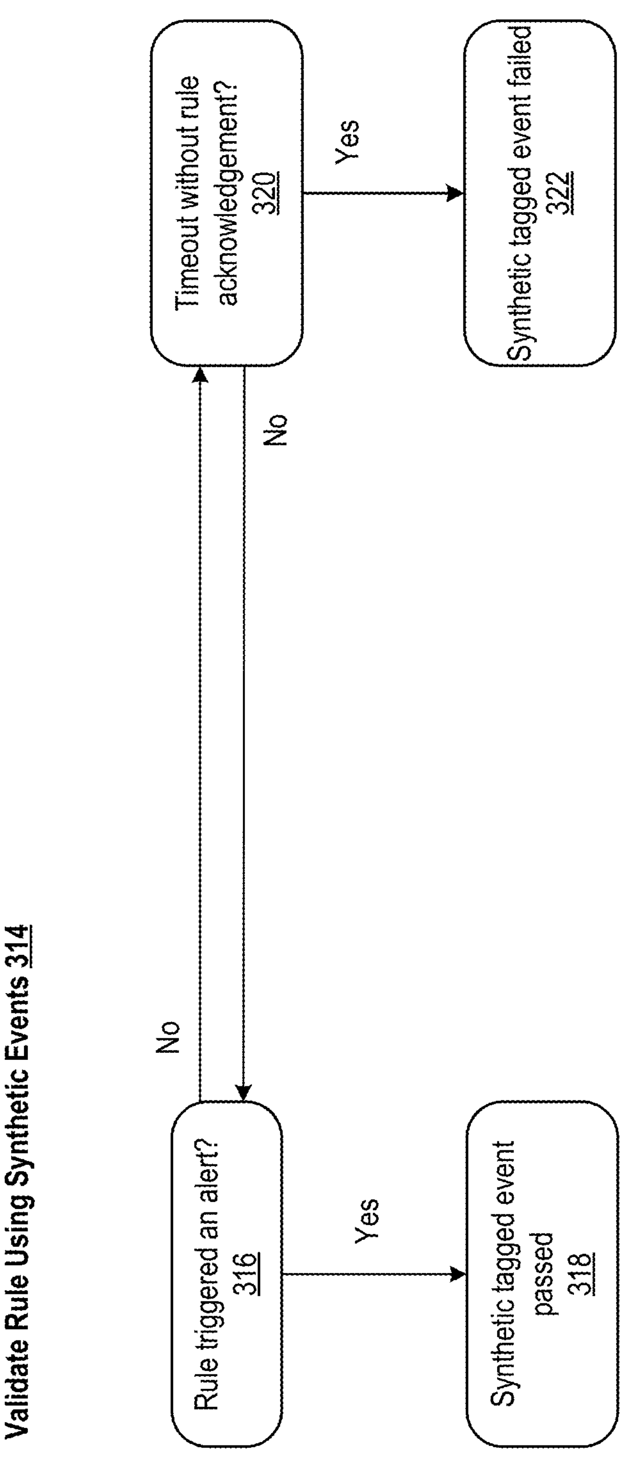
FIG. 3C depicts validating a rule that is supposed to trigger by using synthetic events.

FIG. 3C depicts validating a rule that is supposed to trigger by using synthetic events 314. As described herein, the rule can be validated by the validation engine 208 of the synthetics handler 102. After acknowledgement of the alert, as described in FIG. 3B, it can be determined whether the rule triggered an alert in 316. If the rule did trigger an alert, then the synthetic tagged event passed or was a success (318). A pass or success means that the synthetic event was supposed to trigger a particular rule and in fact caused the particular rule to trigger.

The validation engine 208 can be configured to determine whether a rule that is supposed to trigger an alert is functioning properly. If the synthetic event caused the appropriate rule to trigger, then it can be determined that the synthetic event was a success and that the rule is functioning properly.

If, on the other hand, the rule did not trigger an alert (316), then a predetermined amount of time can pass to see whether the rule triggers an alert during that time. In some cases, the synthetic tagged event can take time to pass through components of the system to then trigger a rule and associated alert. Thus, once the time passes, if there is no rule acknowledgement at timeout (320), then the synthetic tagged event can be tagged as failed or a failure (322). This is the case where the synthetic tagged event is supposed to trigger a rule but that rule did not trigger, either immediately or during the predetermined amount of time thereafter. This can indicate that the rule may not be functioning properly and therefore needs attention (e.g., modification, updating, etc.). So long as the predetermined amount of time does not end (e.g., there is not a timeout in 320), the validation engine 208 can determine whether the rule triggered an alert (316).

Figure 3D:
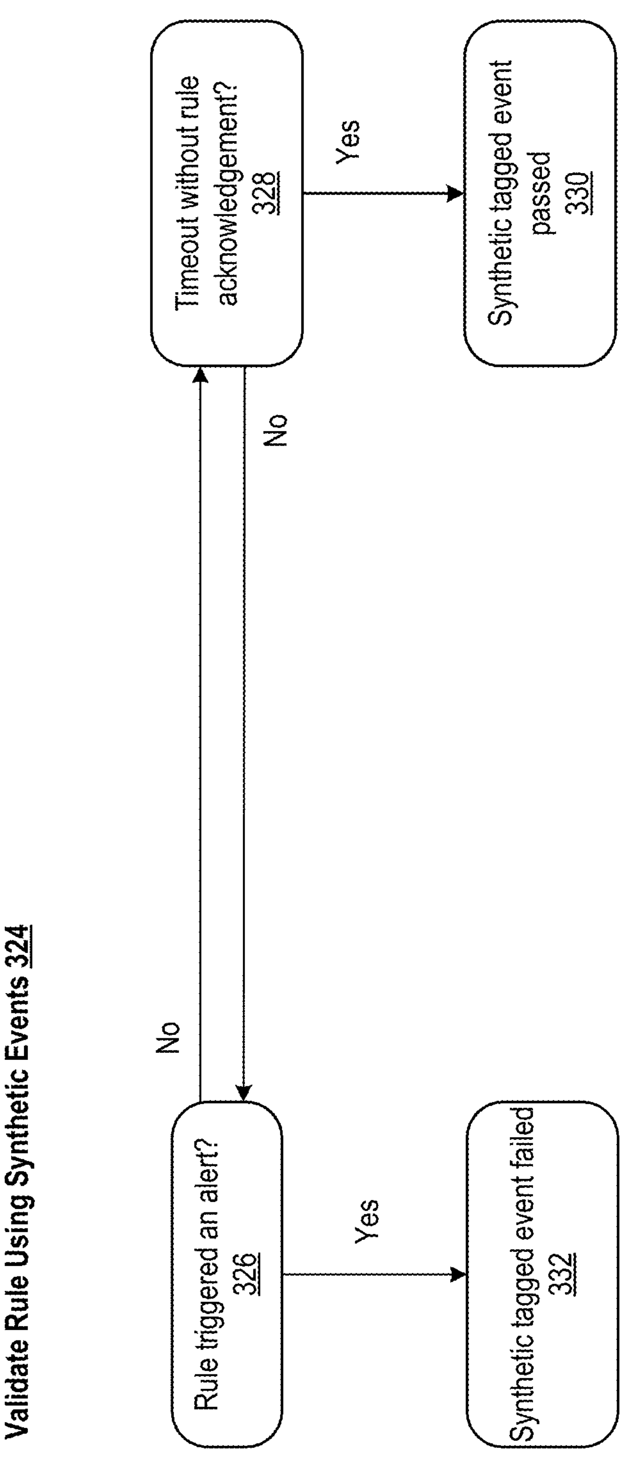
FIG. 3D depicts validating a rule that is not supposed to trigger by using synthetic events.

FIG. 3D depicts validating a rule that is not supposed to trigger by using synthetic events 324. FIG. 3D depicts an inverse scenario of the validation 314 in FIG. 3C. In other words, synthetic events can be used in the validation of 326 to test whether rules are triggered when they are not supposed to be triggered. As described in reference to FIG. 3C, validation 324 can be performed by the validation engine 208.

It can be determined whether a rule triggered an alert in 326. If it did, then the corresponding synthetic event can be identified as failed or a failure in 332. This is the case since the synthetic event was not supposed to trigger the rule. However, since the synthetic event did trigger the rule, the rule should be checked and modified/updated accordingly. The synthetic event could have triggered the rule because the rule is not up-to-date or drafted to appropriately respond to certain events.

If the rule did not trigger an alert in 326, then a predetermined amount of time can pass to see whether the rule triggers an alert during that time. In some cases, the synthetic tagged event can take time to pass through components of the system to then trigger, or not trigger, a rule. Thus, once the time passes, if there is no rule acknowledgement at timeout (328), then the synthetic tagged event can be tagged as passed or a success (330). This is the case where the synthetic tagged event is not supposed to trigger a rule and that rule does not trigger, either immediately or during the predetermined amount of time thereafter. This can indicate that the rule is functioning properly and therefore does not need attention (e.g., modification, updating, etc.). So long as the predetermined amount of time does not end (e.g., there is not a timeout in 328), the validation engine 208 can determine whether the rule triggered an alert (326).

Figure 4:
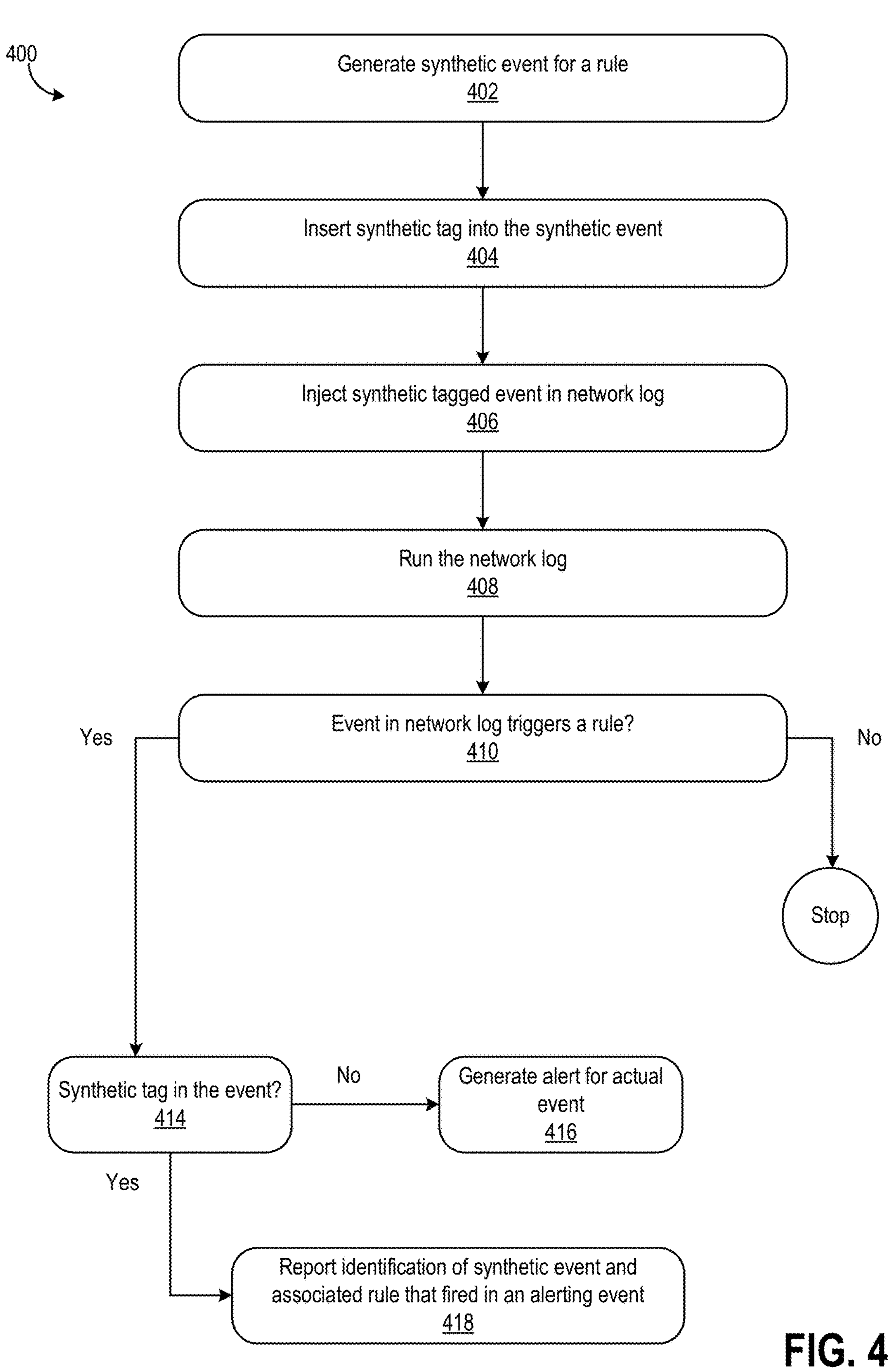
FIG. 4 is a flowchart of a process for generating an alert in response to a synthetic event triggering a rule.

FIG. 4 is a flowchart of a process 400 for generating an alert in response to a synthetic event triggering a rule (e.g., refer to FIG. 1). The process 400 can be performed by one or more systems, such as the synthetics handler 102, the network analysis system 104, and/or the alerting system 106. One or more steps of the process 400 can also be performed by other servers or computing systems.

Referring to the process 400, a synthetic event can be generated for an associated rule in 402. A synthetic tag associated with the rule can be inserted into the generated synthetic event in 404. The synthetic tagged event can then be injected into a stream of network logs in 406. 402-406 can be performed by the synthetics handler 102, as described herein.

The network logs can be run in 408. Events, such as actual and synthetic events, can be executed in an order in which they are presented in the logs. If an event in the network log triggers a rule in 410, then it can be determined whether a synthetic tag is in that event in 414. If the synthetic tag is in the event, then identification of the synthetic event and the associated rule that fired can be reported out in 418. This reporting out can be in the form of an alerting event.

If the synthetic tag is not in the event in 414, then an alert can be generated for an actual event in 416. In other words, the event, which triggered a rule, did not have a synthetic tag, thereby indicating that the event was an actual event (e.g., security threat). Thus, the system (e.g., the network analysis system 104) can be notified of the actual event so that the system can respond appropriately.

Referring back to 410, if the event in the network log does not trigger a rule, then the process 400 can stop. This can indicate that an actual event was not identified. This can also indicate that a synthetic event was injected into the network log but not intended to trigger a rule. In some implementations, 408-410 can be performed by the network analysis system 104 and 414-418 can be performed by the alerting system 106.

Figure 5:
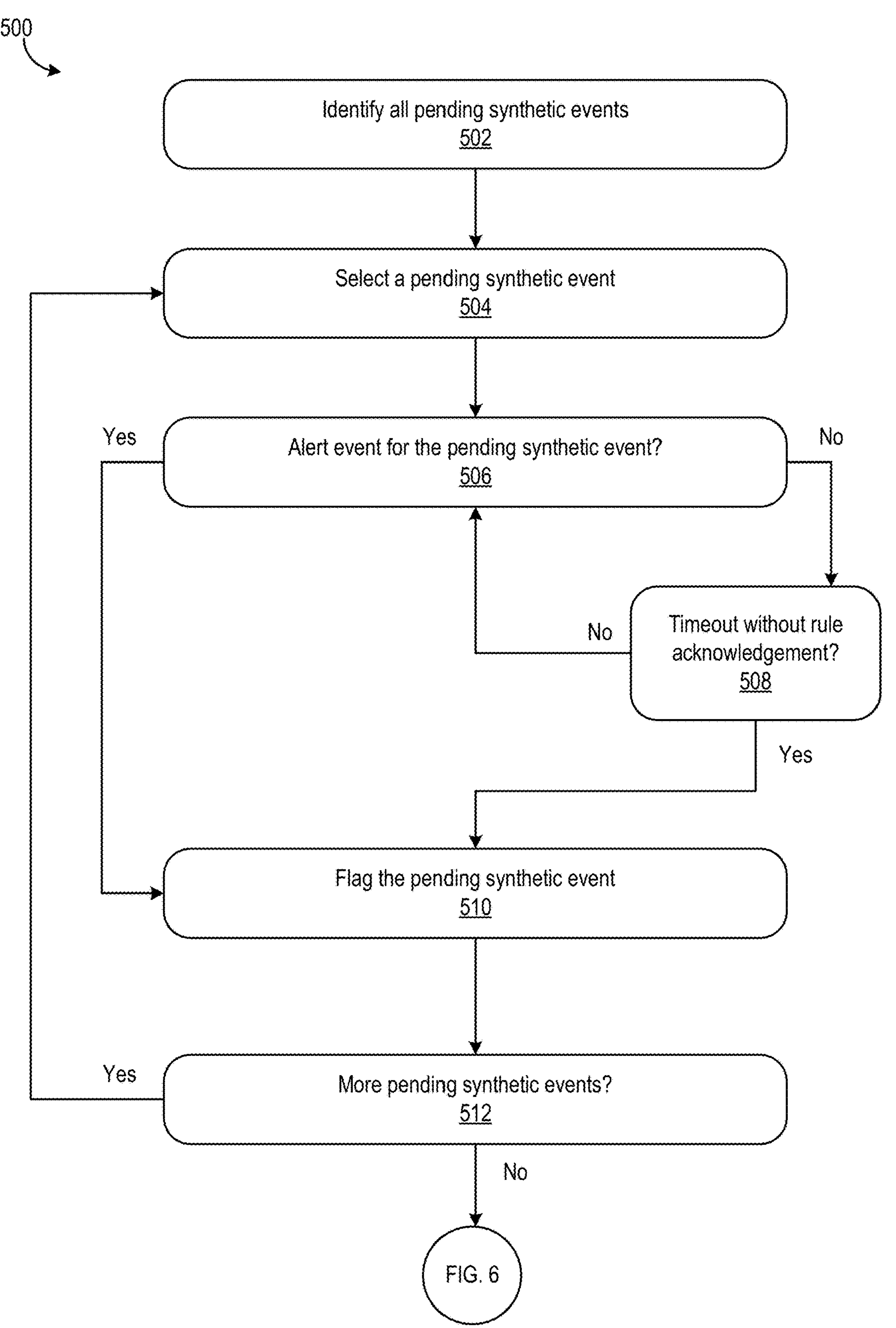
FIG. 5 is a flowchart of a process for analyzing alerts for synthetic event tests.

FIG. 5 is a flowchart of a process 500 for analyzing alerts for synthetic event tests. The process 500 can be used to determine a status of each event in the network logs. In other words, the process 500 can be used to determine whether an event caused a rule to trigger or not. Whether or not the event was a success or failure can be determined using one or more other processes described herein, such as process 600 in FIG. 6. The process 500 can be performed by the alerting system 106. The process 500 can also be performed by one or more other computing systems or servers.

Referring to the process 500, all pending synthetic events can be identified in 502. A pending synthetic event can be selected in 504. Next it can be determined whether there is an alert event for the selected pending synthetic event in 506. If there is an alert event, then the pending synthetic event can be flagged in 510. If there is no alert event for the pending synthetic event in 506, then it can be determined whether a predetermined amount of time passed without rule acknowledgement in 508. If the timeout has not yet occurred (e.g., the predetermined amount of time is still running), then the process 500 can return to 506. If the timeout has occurred and there is still no rule acknowledgement (e.g., alert event), then the pending synthetic event can be flagged in 510. Events that time out (e.g., no rule was triggered) can be flagged. These events can be flagged because the fact that no rules were triggered can indicate that the rules need to be updated/modified so that they do trigger.

Once the synthetic event is flagged, it can be determined whether there are more pending synthetic events in 512. For every pending synthetic event, one or more of the steps 504-510 can be repeated. If there are no more pending synthetic events then the process 500 can stop and/or process 600 depicted and described in reference to FIG. 6 can begin.

Figure 6:
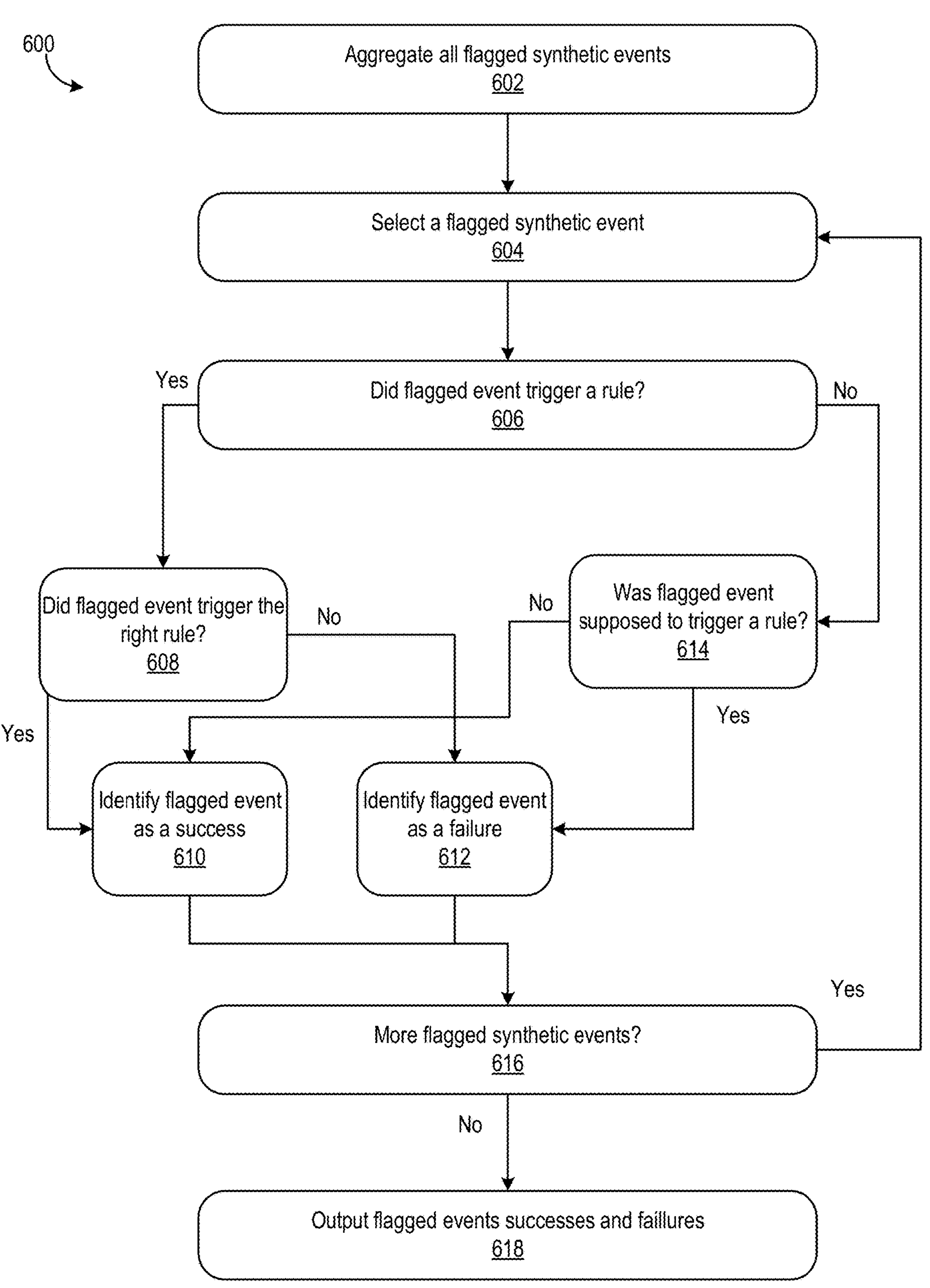
FIG. 6 is a flowchart of a process for determining an overall system and rule performance based on the synthetic event tests.

FIG. 6 is a flowchart of a process 600 for determining an overall system and rule performance based on the synthetic event tests. The process 600 can be performed for all flagged synthetic events (e.g., events that triggered a rule or timed out) to identify whether such events were supposed to trigger a rule and/or whether the appropriate rule was triggered. Such identifications can then be used to determine whether the synthetic events were successes or failures, whether certain rules need to be addressed/modified, and whether the overall system (e.g., the network analysis system 104 and the alerting system 106) perform as intended.

The process 600 can be performed by the synthetics handler 102. The process 600 can also be performed by one or more other computing systems or servers.

Referring to the process 600, all flagged synthetic tagged events can be aggregated in 602. A flagged synthetic event can be selected in 604. It can then be determined whether the flagged event triggered a rule in 606. As described in reference to FIG. 5, some synthetic events might have triggered a rule while others did not trigger a rule but timed out.

If the flagged event did trigger a rule in 606, then it can be determined whether the flagged event triggered the right rule in 608. A synthetic tag in the flagged event can be identified and compared to an identifier for the rule that was triggered by the flagged event. If the synthetic tag and the rule identifier match, then it can be determined that the flagged event triggered the right rule. If the synthetic tag and the rule identifier do not match (or, more generally speaking, the flagged event did not trigger the right rule), then the flagged event can be identified as a failure in 612. If the flagged event is identified as a failure, then the rules need to be analyzed since the appropriate rule was not triggered by the synthetic event. If, on the other hand, the flagged event triggered the right rule in 608, then the flagged event can be identified as a success in 610. If the flagged event is identified as a success, then the rules may not need to be analyzed since the appropriate rule was triggered by the synthetic event.

Referring back to 606, if the flagged event did not trigger a rule, then it can be determined whether the flagged event was supposed to trigger a rule in 614. If the flagged event is not supposed to trigger a rule, then the flagged event can be identified as a success (610). If the flagged event is supposed to trigger a rule but did not, then the flagged event can be identified as a failure (612).

Once the flagged event is identified as either a success (610) or failure (612), it can be determined whether there are more flagged synthetic events in 616. If there are, then 604-616 can be repeated until all flagged synthetic events are analyzed and categorized as successes or failures. If there are no more flagged synthetic events, then the flagged events success and failures can be outputted in 618. In some implementations, a user at the synthetics handler 102 or another device/computing system can be presented with a graphical user interface (GUI) display that outputs reports about the synthetic events (e.g., refer to FIG. 10). The reports can include information about both success and failed synthetic events. The reports can include information about just successful synthetic events or just failed synthetic events. Information reported about failed synthetic events can include but is not limited to indications of what rule was triggered and what rule should have been triggered.

In some implementations, the user can toggle between what information is displayed or outputted in the reports. For example, the user may only want to see the failed synthetic events so that the user can respond to those failures. The output can be dynamically updated and displayed to the user as synthetic events are run and then identified as successes or failures. As a result, the user can respond in a timely fashion to failures and see whether updates to the synthetic events resulted in resolving any of the previously identified failures.

FIG. 7 is a graph 700 depicting rule confidence when synthetic events are not used in system testing. So long as synthetic events are not used to test rules logic and/or components of a detection and alerting system, a confidence rating of whether the rules are functioning properly can be low. The line graph 700 demonstrates confidence ratings over 8 weeks for four different detection signatures or rules 702, 704, 706, and 708. As demonstrated in the graph 700, over eight weeks when synthetic events are not injected into network logs to test the signatures 702-708, signature 702 (e.g., rule) never fires, signature 704 infrequently fires, signature 706 fires frequently but has not fired for some time, and signature 708 has fired but has not fired since week eight. Consequently, and by way of example, signature 702 has an average confidence rating of 0, which indicates that there is no confidence that signature 702 will fire or respond properly to actual threats or events. Signature 704 can have the highest average confidence rating, even though it infrequently fires.

If a rule (e.g., signature) never fires, a confidence rating for that rule can be 0 since the rules logic and components of the detecting and alerting system may never be properly tested. If a rule has fired, a confidence rating can be assumed above 0 since the rules logic and components of the system are working. If a rule has been fired many times but no longer fires, it can be assumed that the rule has a decreased confidence rating since there can be a decrease in potential alerts or broken rules. Moreover, if a rule fires many times and continues to fire, it can be assumed that the rule has an increased confidence rating since there may be consistent alerting. The consistent alerting can mean that the rule is working, however the rule may also be missing alerts.

Figure 8:
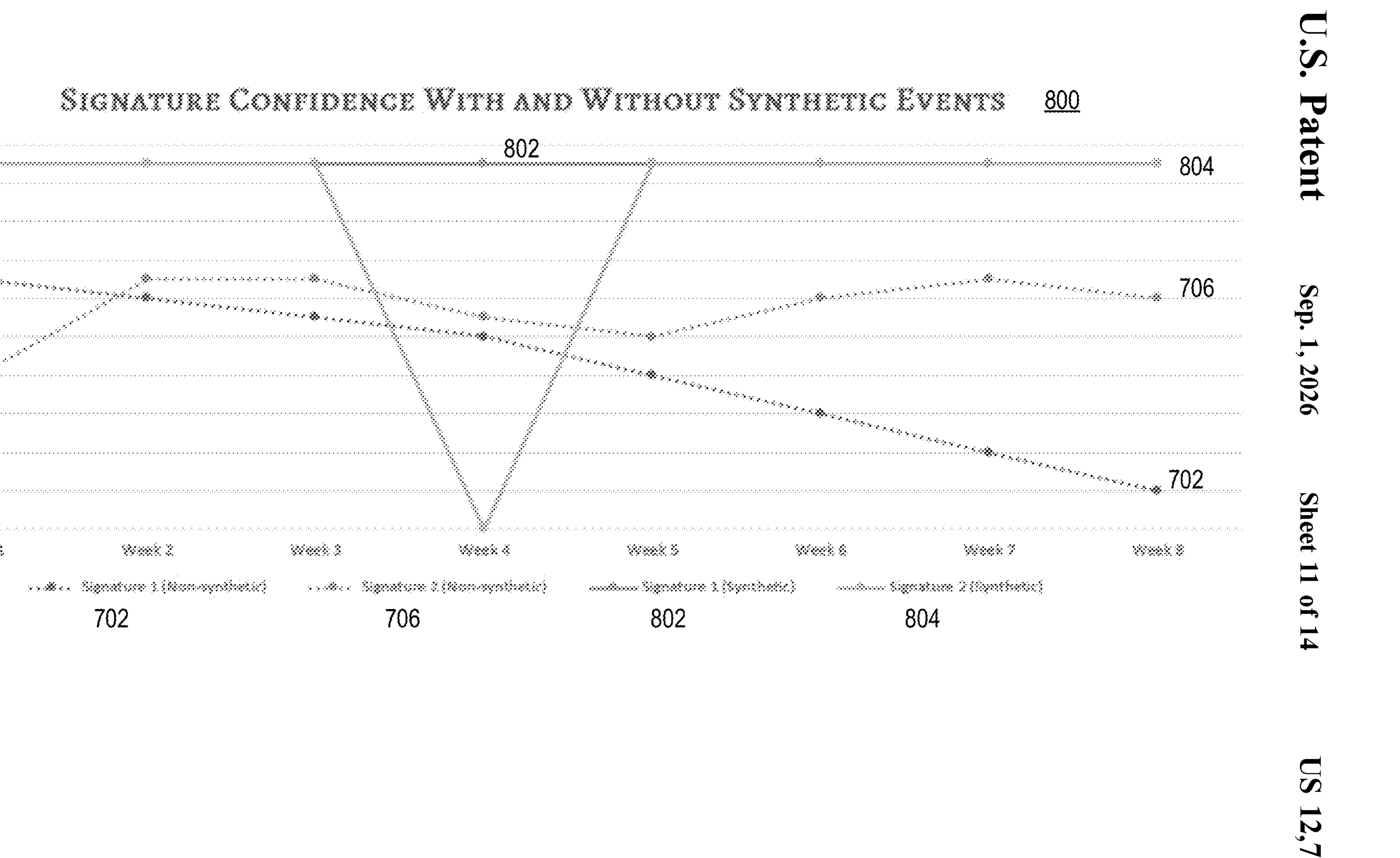
FIG. 8 is a graph depicting rule confidence with and without synthetic events.

FIG. 8 is a graph 800 depicting rule confidence with and without synthetic events. When synthetic events are used to test rules logic and/or components of a detection and alerting system, a confidence rating of whether the rules are functioning can properly can always be identified as high or low.

Synthetic events can provide more assurance that rules are being triggered or not. The synthetic events can also provide for highlighting which rules are triggered and should be addressed to improve the overall confidence rating and triggering.

The line graph 800 demonstrates confidence ratings over 8 weeks for the rules (e.g., signatures) 702 and 706 from the graph 700, which are not tested with synthetic events, and rules 802 and 804, which are tested using synthetic events. As shown by the rules 802 and 804, when synthetic events are submitted on a set frequency (e.g., weekly), the synthetic events can be validated at the set frequency, which can ensure a higher, steadier confidence rating for the rules as well as components of the detection and alerting system. Using synthetic events can turn variable confidence ratings, as shown in the graph 700 of FIG. 7, into binary confidence ratings, thereby increasing confidence in the overall detection and alerting system. Thus, synthetic events makes apparent which rules and/or components of the system are improperly functioning so that a user or other system developer can immediately address the rules and/or components.

If validation of a rule fails when the synthetic events are used, a confidence rating for the rule can be reduced to 0 until the rule is addressed or fixed. After all, the confidence rating of 0 indicates a 100% confidence that the rule does not work properly. Since the rule does not work properly, it can be immediately addressed/modified. Once synthetic events are submitted the next week, the confidence rating for the fixed rule can change, for example, by increasing to a confidence rating of 95. The confidence rating of 95 indicates a near 100% confidence that the rule in fact works properly at the time of the synthetic event. Using a confidence rating of 95 as a benchmark can be advantageous to ensure that the rules are triggering properly and not missing alerts. A 100 confidence rating may not be as accurate because it can report rules that miss alerts as still being triggered properly. Thus, a 100 confidence rating can be over-inclusive. Similarly, a confidence rating less than 95 can be under-inclusive. Regardless, different threshold confidence ratings can be used depending on user preference and/or the detection and alerting system. The threshold confidence rating can also dynamically adjust based on historic confidence ratings for rules and components that are tested with synthetic events.

Still referring to FIG. 8, as shown in the graph 800, with the rules 702 and 706 (which are not tested with synthetic events), one can never be truly confident about their performance. For example, after week four, confidence in the rules 702 and 706 decreases greatly, but users or developers of the detection and alerting system may be unaware of whether there is in fact an issue with the rules 702 and 706. No signature event alerts in this situation does not mean the rules 702 or 706 or the system is working or broken or otherwise needs attention. The users or developers will not know unless someone decides to review the rules or system or another, if any, alert is brought to the attention of the users or developers. On the other hand, when synthetic events are used for testing the rules 802 and 804, confidence is overall increased. There is increased awareness of a potential issue at week 4 because the confidence rating for the rule 804 went from 95 to 0 within a week. A synthetic event had failed to validate the rule 804 at week 4, thereby indicating to users or other developers that there was an issue at week 4. The users or developers can address the issue, whereas they might not have been able to identify an issue for the rules 702 and 706, where synthetic event alerts were not triggered.

In fact, as shown in the graph 800, the users or developers did address the issue with the rule 804 because the confidence rating for the rule 804 returned to 95 in week 5 and remained at 95 through week 8. Once the issue was resolved and subsequent synthetic events were used to test the rule 804, the rule 804 continued to fire properly. Thus, the confidence rating remained constantly high.

Figure 9:
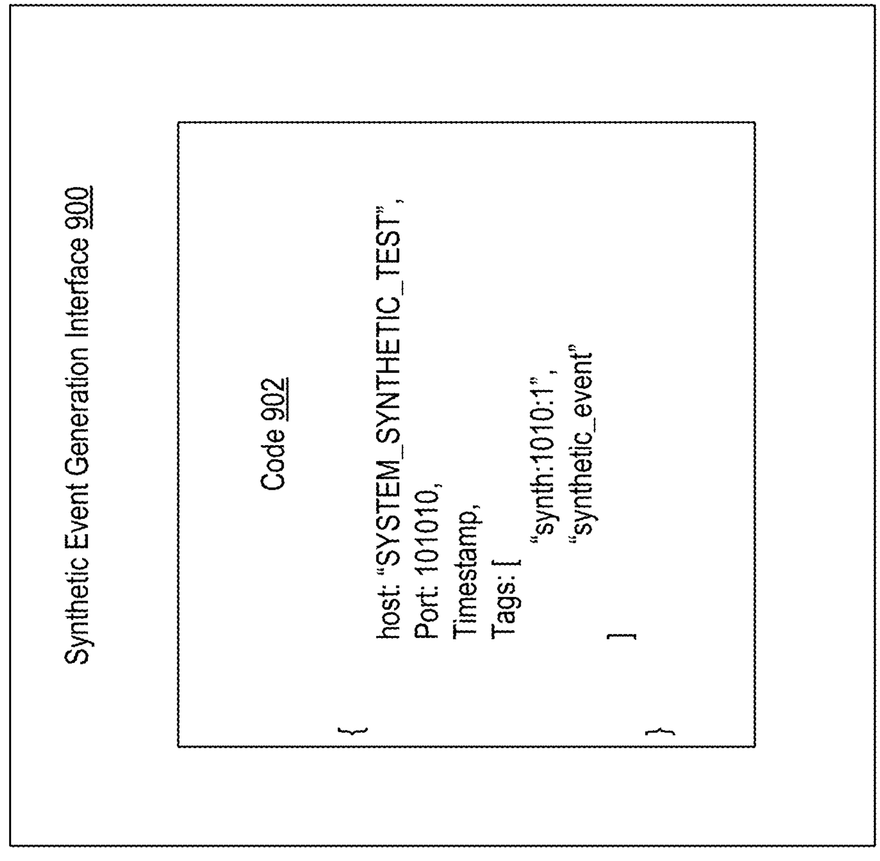
FIG. 9 depicts an example segment of code for a synthetic event.

FIG. 9 depicts an example segment of code 902 for a synthetic event. As described herein, a user or other developer at the synthetics handler 102 or another computing system/device can be presented with a synthetic event generation interface 900. In some implementations, the interface 900 can be provided by the synthetic event generator 202 of the synthetics handler 102. The code 902, presented in the interface 900, can be edited or modified by the user. The code 902 can also be presented to the user in a template associated with a rule that the user wants to test. The user can then modify the code 902 in the template according to the user's testing preferences. In some implementations, the user may only change or update a timestamp for running the synthetic event. The user can then keep the remaining code in the template. The template can include information such as a host identifier, a network identifier, a timestamp, and tags. The tags can be strings. The tags can be used to indicate that the event generated by the code 902 is a synthetic event. Therefore, when the event is injected into network logs, the network analysis system 104 and/or the alerting system 106 can realize that the event is synthetic rather than an actual event. The system 104 and/or 106 may not actually report or alert on the synthetic event since the synthetic event is tagged for testing. A regular/actual event, on the other hand, can have a flag to send an alert when a problem is identified.

The code 902 can include a unique identifier for the synthetic event. Every time the synthetic event is injected into the network logs and/or run, the identifier can change. This can be beneficial for the user or developer to identify causes of failures associated with the synthetic event. As mentioned, the user can add inclusions and/or exclusions to the code 902 so that certain parts of a rule can be tested or not tested by the synthetic event. The user can also modify the code 902 to reflect different types of event validations or rule scenarios. As a result, the user can create more robust and dynamic ongoing security checks of the systems 104 and/or 106. In yet other implementations, when synthetic events are injected into the network logs, the user can identify which events should be included or excluded so that different rules and/or components can be tested. In other words, the user can choose to only push synthetic events for some rules into the network logs and then push other synthetic events for other rules into the network logs at a different time. The user can then control how much reporting the user receives, which can make it more manageable (time and/or effort-wise) for the user to modify rules that are associated with failed synthetic events.

The code 902 creates a synthetic event that is intended to accurately match logic of a rule that is being tested/triggered by the synthetic event. The user can add metadata to the code 902 so that certain parts of a rule are excluded or included in the testing. For example, the user might have already reviewed parts of a rule and therefore does not want to test those parts now, so the user can exclude those parts of the rule from the code 902 for this synthetic event. Excluding certain parts of a rule can be beneficial to ensure that the user can target any aspect of the rule and/or components of the system described herein to test proper functioning. In other words, if the user could not exclude certain parts of a rule, the user would not be able to test other parts of the rule that may be causing failures.

Moreover, whenever a synthetic event is identified as a failure, the user can look into the code 902 to determine whether there was an error in the logic of the rule itself or something else. In some implementations, the user can also set the code 902 to report out how many times an expected event within the synthetic event is triggered. Depending on how many passes are actually seen or reported when running the synthetic event, a user can determine where and/or why the associated rule is not triggering properly.

Figure 10:
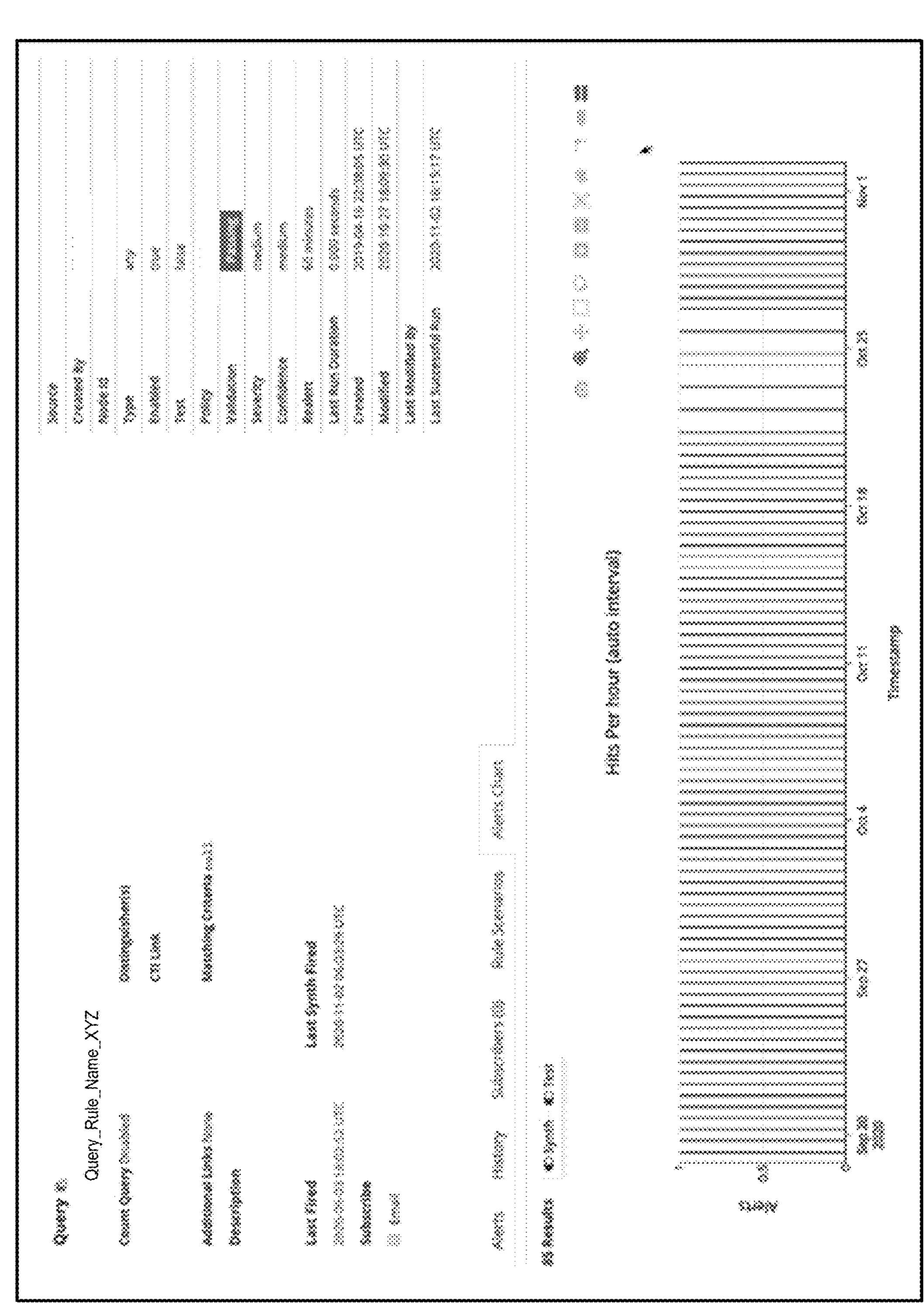
FIG. 10 depicts an example output of synthetic event testing.

FIG. 10 depicts an example output 1000 of synthetic event testing. The output 1000 can be provided in a graphical user interface (GUI) display to the user at the synthetics handler 102 or another computing system or device. FIG. 10 displays some example fields and data in the output 1000 but it is not meant to be limiting. The output 1000 can be displayed per rule that is tested by a synthetic event. The output 1000 can also be displayed per query, which can be a genus of many rules that are being tested. All rules that are tested can be linked to the query.

The output 1000 can include a tab (e.g., user interface) for alerts. By clicking on this tab, a user can view the code (e.g., refer to FIG. 9) for the generated synthetic events as well as code or logic for rules that comprise a query. The user can also view a listing of all alerts in the network logs, including both synthetic event alerts and event alerts without synthetics.

The output 1000 can include a tab for history. By clicking on this tab, the user can view changes that were made to rules logic. In other words, the history tab can show history of a rule itself. Changes to the rules logic can be made by the user or other users or developers. The changes can be made in response to running the synthetic events and identifying why one or more of the synthetic events failed. The changes can also be made in response to routine checks/updates, regardless of whether synthetic events are run to test the rules logic.

The output 1000 can include a tab for rule scenarios. The rule scenarios tab can include an interface for generating synthetic events (e.g., see FIG. 9) and injecting the events into the network logs at predetermined time intervals. The rule scenarios tab can also provide indicators of which synthetic events passed, failed, or experienced an error (e.g., conflicting with another event or another rule). Any such error can be an indicator that the query, or rule logic therein, is not functioning properly. In some implementations, at predetermined time intervals (e.g., every 12 hours), there can be an upstream change to the query, which can be reflected in the performance indicators for synthetic events in the rules scenario tab. Moreover, the rules scenario tab can include acknowledgements or performance indicators for synthetic events that were previously ran in the alerting pipeline of the system. As a result, a user can view a historic performance of rules or a query that are tested.

The output 100 can include a tab for alerts charts. By clicking on this tab, as depicted in FIG. 10, the user receives a global view of how often synthetic events run and when they are successful (e.g., when alerts are fired, both from synthetic events and/or actual events). This view can make it easier for the user to identify failures and successes instead of going through each rule scenario in the rules scenario tab.

The output 1000 can include one or more additional information. For example, the output 1000 can list all synthetic events that were run and which rules were tested and/or validated. This information can be updated every 12 hours or at other predetermined time intervals. The output 1000 can also include a dynamically-updating list of synthetic events that are currently running. For each synthetic event, outputted information can include when the event was last run, when the event was last modified, when the event was triggered, a current status, and whether validation is currently passing or failing or has passed or failed. The output 1000 can also include a list of which rules and/or synthetic events are included or excluded from testing. For example, during a first 12 hour cycle, the user may choose to only include synthetic events for rules 1-10 and exclude synthetic events for rules 11-20. Then, during a second 12 hour cycle, the user may choose to only include synthetic events for rules 11-20 and exclude synthetic events for rules 1-10. The user can adjust the inclusions and exclusions manually. For example, during a 12 hour cycle, the user can choose to manually inject a synthetic event into the network logs, even if it was originally excluded from running during that 12 hour cycle.

Figure 11:
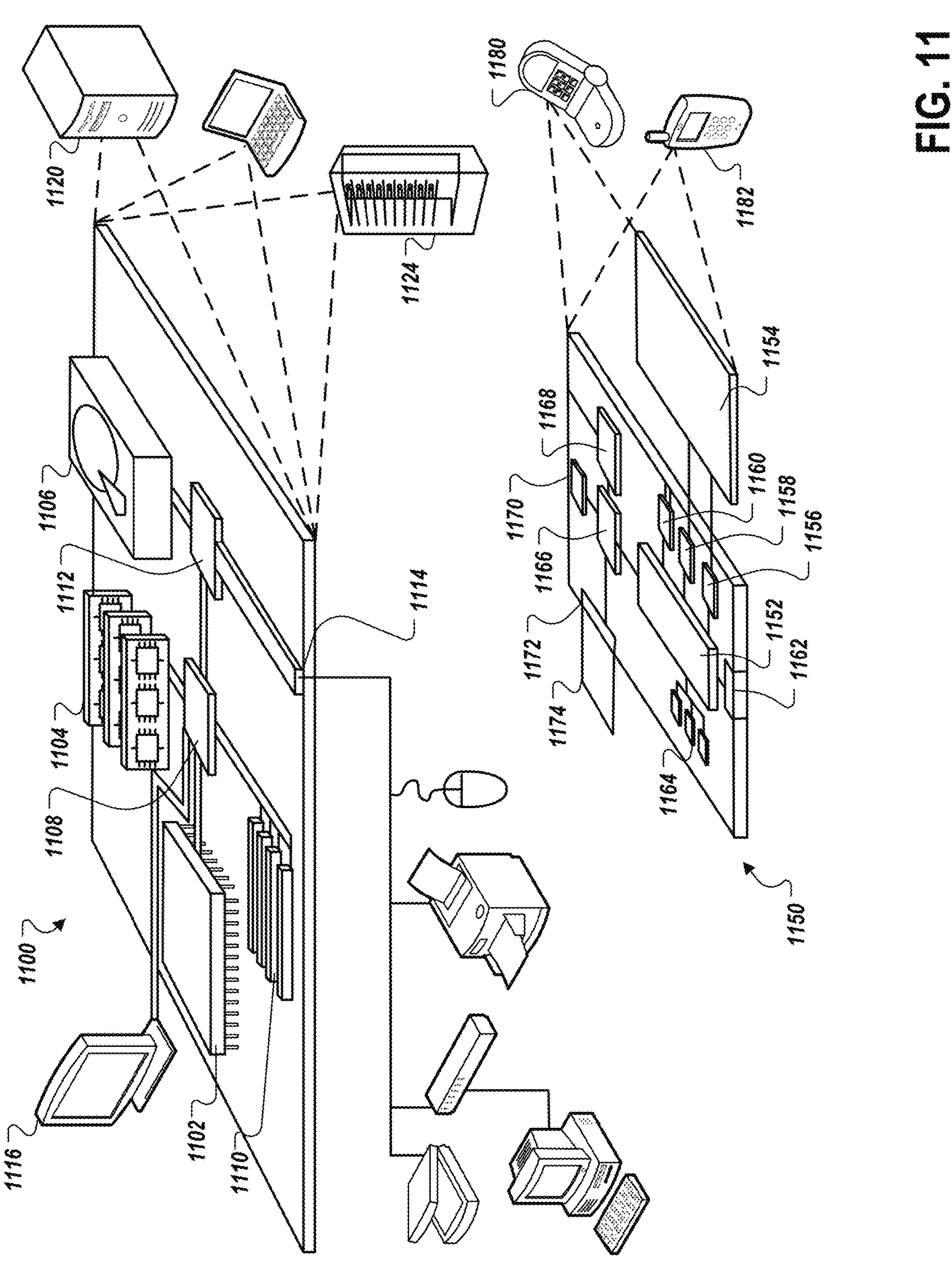
FIG. 11 is a schematic diagram that shows an example of a computing device and a mobile computing device.

FIG. 11 shows an example of a computing device 1100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 can also be another form of computer-readable medium, such as a magnetic or optical disk.

The storage device 1106 is capable of providing mass storage for the computing device 1100. In some implementations, the storage device 1106 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. In some implementations, the high-speed interface 1108 is coupled to the memory 1104, the display 1116 (e.g., through a graphics processor or accelerator), and to the high-speed expansion ports 1110, which can accept various expansion cards (not shown). In the implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. In addition, it can be implemented in a personal computer such as a laptop computer 1122. It can also be implemented as part of a rack server system 1124. Alternatively, components from the computing device 1100 can be combined with other components in a mobile device (not shown), such as a mobile computing device 1150. Each of such devices can contain one or more of the computing device 1100 and the mobile computing device 1150, and an entire system can be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 can also be provided with a storage device, such as a micro-drive or other device, to provide additional storage. Each of the processor 1152, the memory 1164, the display 1154, the communication interface 1166, and the transceiver 1168, are interconnected using various buses, and several of the components can be mounted on a common motherboard or in other manners as appropriate.

The processor 1152 can execute instructions within the mobile computing device 1150, including instructions stored in the memory 1164. The processor 1152 can be implemented as a chipset of chips that include separate and multiple analog and digital processors. The processor 1152 can provide, for example, for coordination of the other components of the mobile computing device 1150, such as control of user interfaces, applications run by the mobile computing device 1150, and wireless communication by the mobile computing device 1150.

The processor 1152 can communicate with a user through a control interface 1158 and a display interface 1156 coupled to the display 1154. The display 1154 can be, for example, a TFT (Thin-Film-Transistor Liquid Crystal Display) display or an OLED (Organic Light Emitting Diode) display, or other appropriate display technology. The display interface 1156 can comprise appropriate circuitry for driving the display 1154 to present graphical and other information to a user. The control interface 1158 can receive commands from a user and convert them for submission to the processor 1152. In addition, an external interface 1162 can provide communication with the processor 1152, so as to enable near area communication of the mobile computing device 1150 with other devices. The external interface 1162 can provide, for example, for wired communication in some implementations, or for wireless communication in other implementations, and multiple interfaces can also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 can also be provided and connected to the mobile computing device 1150 through an expansion interface 1172, which can include, for example, a SIMM (Single In Line Memory Module) card interface. The expansion memory 1174 can provide extra storage space for the mobile computing device 1150, or can also store applications or other information for the mobile computing device 1150. Specifically, the expansion memory 1174 can include instructions to carry out or supplement the processes described above, and can include secure information also. Thus, for example, the expansion memory 1174 can be provide as a security module for the mobile computing device 1150, and can be programmed with instructions that permit secure use of the mobile computing device 1150. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1164, the expansion memory 1174, or memory on the processor 1152. In some implementations, the computer program product can be received in a propagated signal, for example, over the transceiver 1168 or the external interface 1162.

The mobile computing device 1150 can communicate wirelessly through the communication interface 1166, which can include digital signal processing circuitry where necessary. The communication interface 1166 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1168 using a radio-frequency. In addition, short-range communication can occur, such as using a Bluetooth, WiFi, or other such transceiver (not shown). In addition, a GPS (Global Positioning System) receiver module 1170 can provide additional navigation- and location-related wireless data to the mobile computing device 1150, which can be used as appropriate by applications running on the mobile computing device 1150.

The mobile computing device 1150 can also communicate audibly using an audio codec 1160, which can receive spoken information from a user and convert it to usable digital information. The audio codec 1160 can likewise generate audible sound for a user, such as through a speaker, e.g., in a handset of the mobile computing device 1150. Such sound can include sound from voice telephone calls, can include recorded sound (e.g., voice messages, music files, etc.) and can also include sound generated by applications operating on the mobile computing device 1150.

The mobile computing device 1150 can be implemented in a number of different forms, as shown in the figure. For example, it can be implemented as a cellular telephone 1180. It can also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for testing an alerting pipeline of a security network, the method comprising:

generating a synthetic event that is a non-malicious version of an actual security event, wherein the synthetic event is assigned a synthetic tag, wherein, when executed, the synthetic event tests one or more detection signatures of a security network;

injecting the synthetic event into a network log of events; and configuring a network analysis computing system to capture event triggers related to the synthetic event, wherein the configuring of the network analysis computing system causes the network analysis computing system to perform operations comprising:

identifying an event in the network log of events that triggers a detection signature of the security network;

determining whether the event is the injected synthetic event based on identifying the synthetic tag in the event;

returning information about whether the event is the injected synthetic event;

determining whether the detection signature triggered an alert in the security network; and in response to determining that the detection signature triggered the alert, identifying the injected synthetic event as a success.

2. The method of claim 1, wherein the operations performed by the network analysis computing system further comprise determining that the event is an actual alerting event based on determining that the event is not assigned the synthetic tag.

3. The method of claim 1, wherein returning the information comprises returning an indication that the detection signature of the security network was triggered in the event.

4. The method of claim 3, wherein the operations performed by the network analysis computing system further comprise validating the detection signature based on the returned information.

5. The method of claim 1, wherein generating the synthetic event comprises:

identifying a first of the detection signatures of the security network to test;

receiving a synthetic event template that resembles an actual security threat that triggers the first of the detection signatures; and generating the synthetic event using the synthetic event template; and injecting a synthetic tag into the synthetic event.

6. The method of claim 1, wherein generating the synthetic event further comprises injecting a timestamp into the synthetic event.

7. The method of claim 6, wherein the timestamp is included in a synthetic event template that is used to generate the synthetic event and based on one or more formatting requirements.

8. A system for testing an alerting pipeline of a security network, the system comprising:

one or more processors; and memory storing instructions that, when executed, cause the one or more processors to perform operations comprising:

generating a synthetic event that is a non-malicious version of an actual security event, wherein the synthetic event is assigned a synthetic tag, wherein, when executed, the synthetic event tests one or more detection signatures of a security network;

injecting the synthetic event into a network log of events; and configuring a network analysis computing system to capture event triggers related to the synthetic event, wherein the configuring of the network analysis computing system causes the network analysis computing system to perform operations comprising:

identifying an event in the network log of events that triggers a detection signature of the security network;

determining whether the event is the injected synthetic event based on identifying the synthetic tag in the event;

returning information about whether the event is the injected synthetic event;

determining whether the detection signature triggered an alert in the security network; and in response to determining that the detection signature triggered the alert, identifying the injected synthetic event as a success.

9. The system of claim 8, wherein the operations performed by the network analysis computing system further comprise determining that the event is an actual alerting event based on determining that the event is not assigned the synthetic tag.

10. The system of claim 8, wherein returning the information comprises returning an indication that the detection signature of the security network was triggered in the event.

11. The system of claim 10, wherein the operations performed by the network analysis computing system further comprise validating the detection signature based on the returned information.

12. The system of claim 8, wherein generating the synthetic event comprises:

identifying a first of the detection signatures of the security network to test;

receiving a synthetic event template that resembles an actual security threat that triggers the first of the detection signatures; and generating the synthetic event using the synthetic event template; and injecting a synthetic tag into the synthetic event.

13. The system of claim 8, wherein generating the synthetic event further comprises injecting a timestamp into the synthetic event.

14. The system of claim 13, wherein the timestamp is included in a synthetic event template that is used to generate the synthetic event and based on one or more formatting requirements.

* * * * *